(12) United States Patent
Kutaragi et al.

(10) Patent No.: US 9,204,198 B2
(45) Date of Patent: *Dec. 1, 2015

(54) SERVER SYSTEM FOR REAL-TIME MOVING IMAGE COLLECTION, RECOGNITION, CLASSIFICATION, PROCESSING, AND DELIVERY

(71) Applicant: CYBER AI ENTERTAINMENT INC., Tokyo (JP)

(72) Inventors: Ken Kutaragi, Tokyo (JP); Takashi Usuki, Tokyo (JP); Yasuhiko Yokote, Tokyo (JP)

(73) Assignee: CYBER AI ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,067

(22) Filed: Sep. 9, 2014

(65) Prior Publication Data

US 2014/0380397 A1 Dec. 25, 2014

Related U.S. Application Data

(63) Continuation of application No. 13/640,010, filed as application No. PCT/JP2011/059009 on Apr. 11, 2011, now Pat. No. 8,863,183.

(30) Foreign Application Priority Data

Apr. 9, 2010 (JP) ................................. 2010-090727

(51) Int. Cl.
*H04N 21/4788* (2011.01)
*H04N 21/2743* (2011.01)
(Continued)

(52) U.S. Cl.
CPC ....... *H04N 21/4788* (2013.01); *H04N 21/2343* (2013.01); *H04N 21/23418* (2013.01);
(Continued)

(58) Field of Classification Search
CPC .................. H04N 21/23417; H04N 21/23418; H04N 21/2743
See application file for complete search history.

(56) References Cited

U.S. PATENT DOCUMENTS

| 6,755,743 B1 | 6/2004 | Yamashita et al. |
| 2004/0114032 A1 | 6/2004 | Kakii et al. |

(Continued)

FOREIGN PATENT DOCUMENTS

| EP | 2 083 564 A2 | 7/2009 |
| JP | 2001-120841 A | 5/2001 |

(Continued)

OTHER PUBLICATIONS

Duygulu et al., "Object Recognition as Machine Translation: Learning a Lexicon for a Fixed Image Vocabulary," European Conference on Computer Vision (ECCV), pp. 97-112, 2002.

(Continued)

*Primary Examiner* — Hai V Tran
(74) *Attorney, Agent, or Firm* — Seed IP Law Group PLLC

(57) ABSTRACT

Provided is a server system in which real-time communication based on a moving image group is performed between a number of users. The moving image collection/delivery server system accumulates moving images sequentially uploaded in real time via a network in a database, generates moving image thumbnails used to simultaneously display a plurality of moving images on a single display screen in real time, allocates the moving image thumbnails to a channel group adaptively generated from sequentially uploaded moving images, and delivers the moving image thumbnails to a terminal having a display and operating unit in real time via a network, and the sequentially generated moving image thumbnails are stored in an allocated channel in ascending order of shooting times and delivered to a plurality of terminals.

20 Claims, 30 Drawing Sheets

(51) Int. Cl.
  *H04N 21/234* (2011.01)
  *H04N 21/2343* (2011.01)
  *H04N 21/254* (2011.01)
  *H04N 21/2668* (2011.01)
  *H04N 21/482* (2011.01)

(52) U.S. Cl.
  CPC ... *H04N21/234363* (2013.01); *H04N 21/2541* (2013.01); *H04N 21/2668* (2013.01); *H04N 21/2743* (2013.01); *H04N 21/4821* (2013.01); *H04N 21/4825* (2013.01)

(56) References Cited

U.S. PATENT DOCUMENTS

| 2004/0198497 | A1 | 10/2004 | Yamashita et al. |
| 2004/0198498 | A1 | 10/2004 | Yamashita et al. |
| 2010/0074595 | A1 | 3/2010 | Okamoto |

FOREIGN PATENT DOCUMENTS

| JP | 2004-007561 A | 1/2004 |
| JP | 2009-194491 A | 8/2009 |
| JP | 2009-265754 A | 11/2009 |
| JP | 2009-290651 A | 12/2009 |
| JP | 2010-041500 A | 2/2010 |
| JP | 2010-081129 A | 4/2010 |

OTHER PUBLICATIONS

Fergus et al., "Object Class Recognition by Unsupervised Scale-Invariant Learning," IEEE Conf. on Computer Vision and Pattern Recognition, pp. 264-271, 2003.

Lowe, D., "Object Recognition from Local Scale-Invariant Features," Proc. IEEE International Conference on Computer Vision, pp. 1150-1157, 1999.

Sivic et al., "Video Google: A Text Retrieval Approach to Object Matching in Videos," Proc. IVVC 2003, 2:1470-1477, 2003.

Csurka et al., "Visual Categorization with Bags of Keypoints," Proc. EVVC Workshop on Statistical Learning in Computer Vision, pp. 1-22, 2004.

International Search Report, mailed Jun. 14, 2011, for PCT/JP2011/059009, 2 pages.

Extended European Search Report dated Feb. 10, 2015, for corresponding EP Application No. 11766034.0-1905 / 2557782, 11 pages.

Holub et al., "Towards Unlocking Web Video: Automatic People Tracking and Clustering," IEEE Computer Society Conference on Computer Vision and Pattern Recognition Workshops, Miami, FL, Jun. 20-25, 2009, pp. 47-54.

Liu et al., "Topic Mining on Web-Shared Videos," IEEE International Conference on Acoustics, Speech and Signal Processing, Las Vegas, NV, Mar. 31-Apr. 4, 2008, pp. 2145-2148.

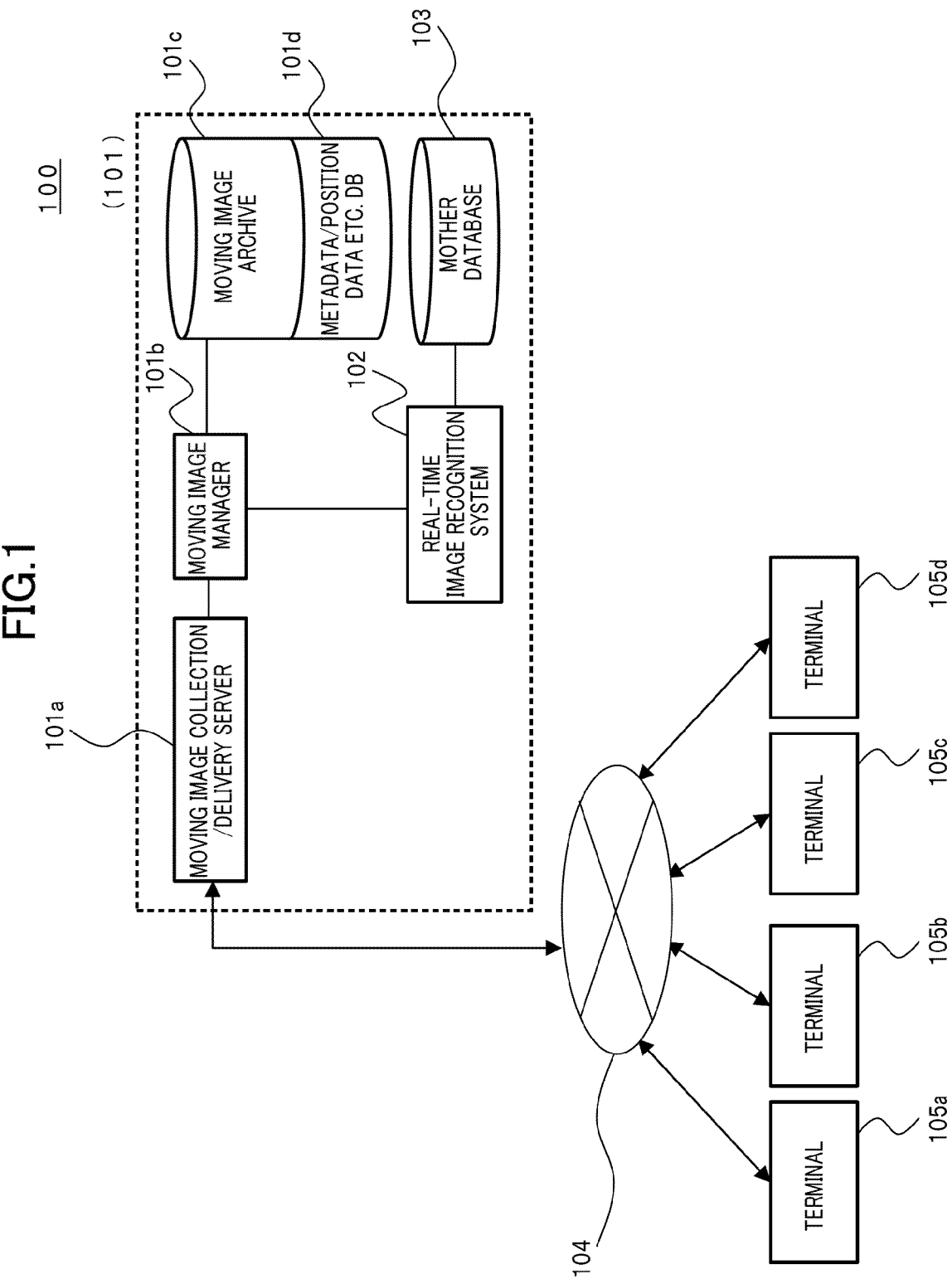

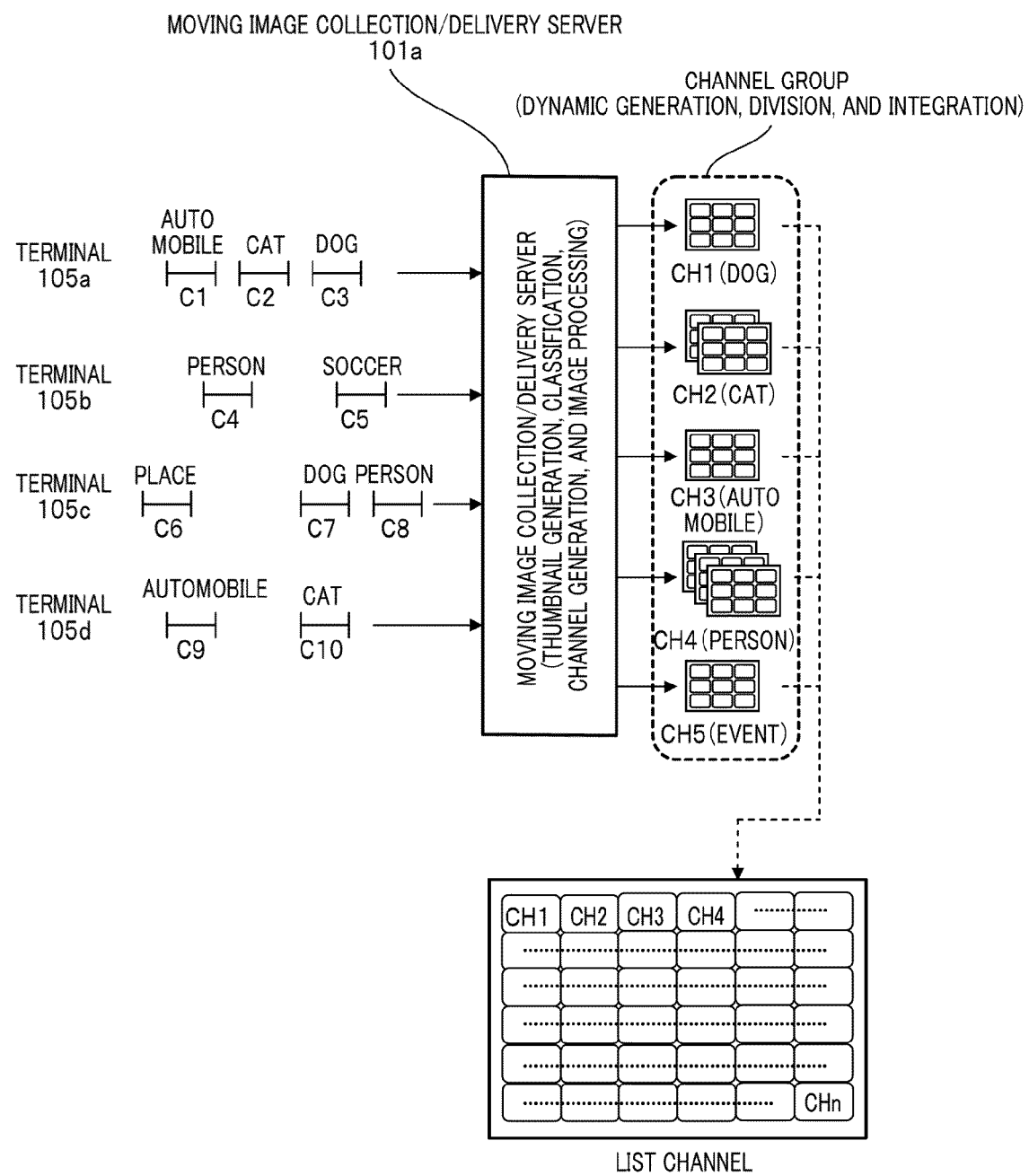

FIG.14
(A)
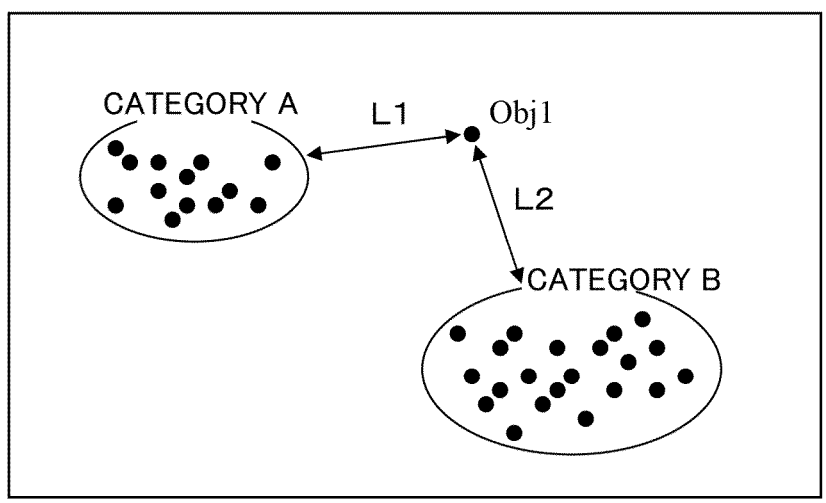
(B)
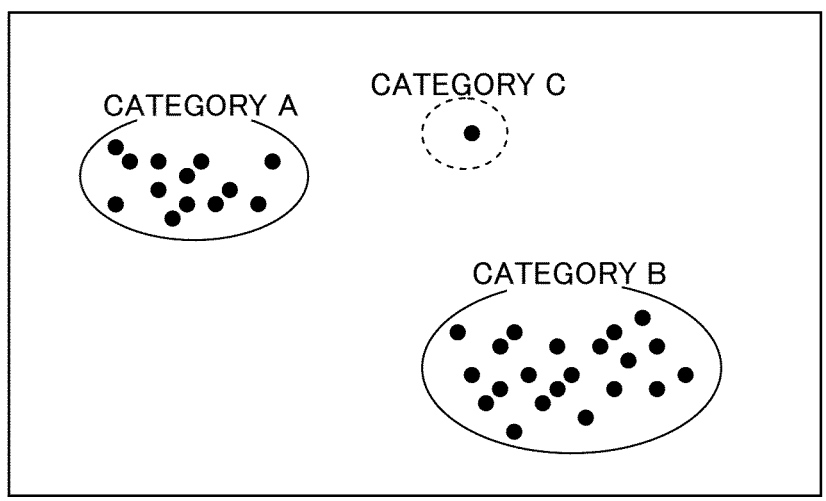

FIG.15
(A)
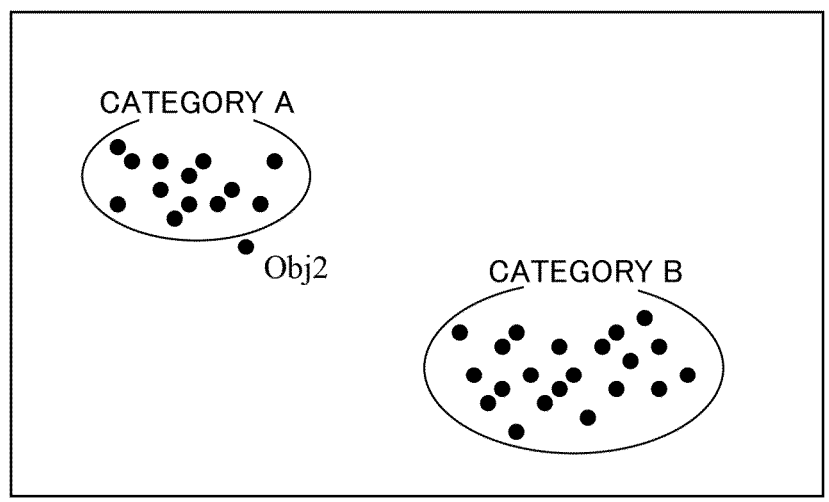
(B)
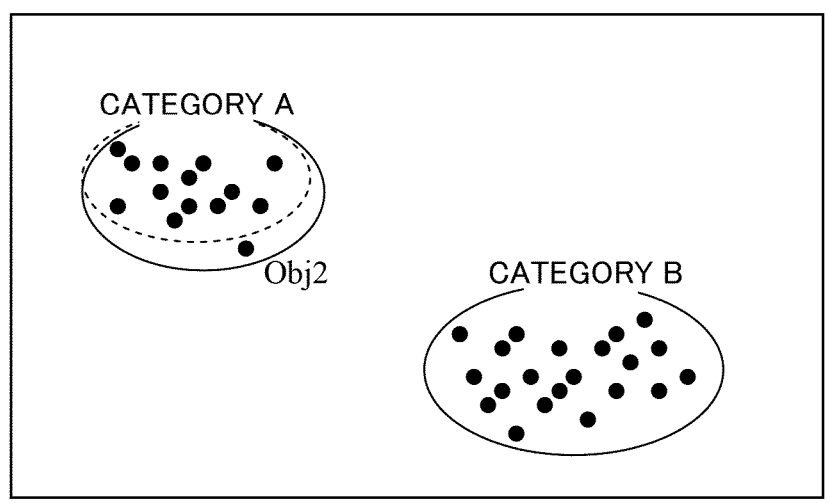

FIG.18
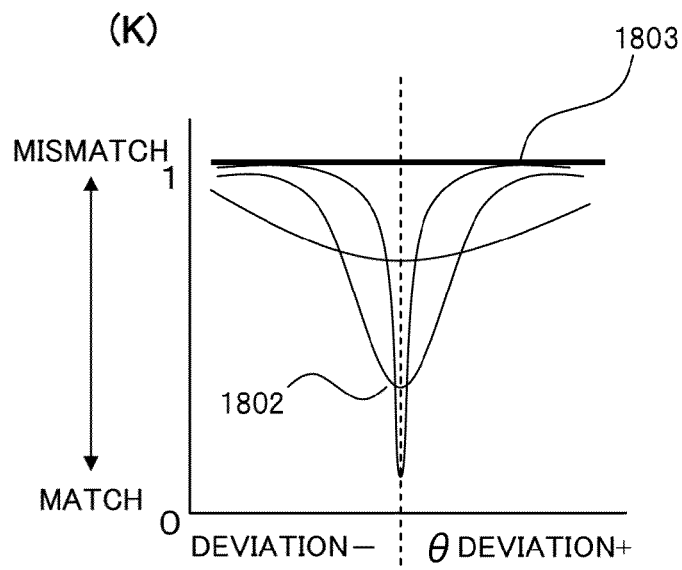
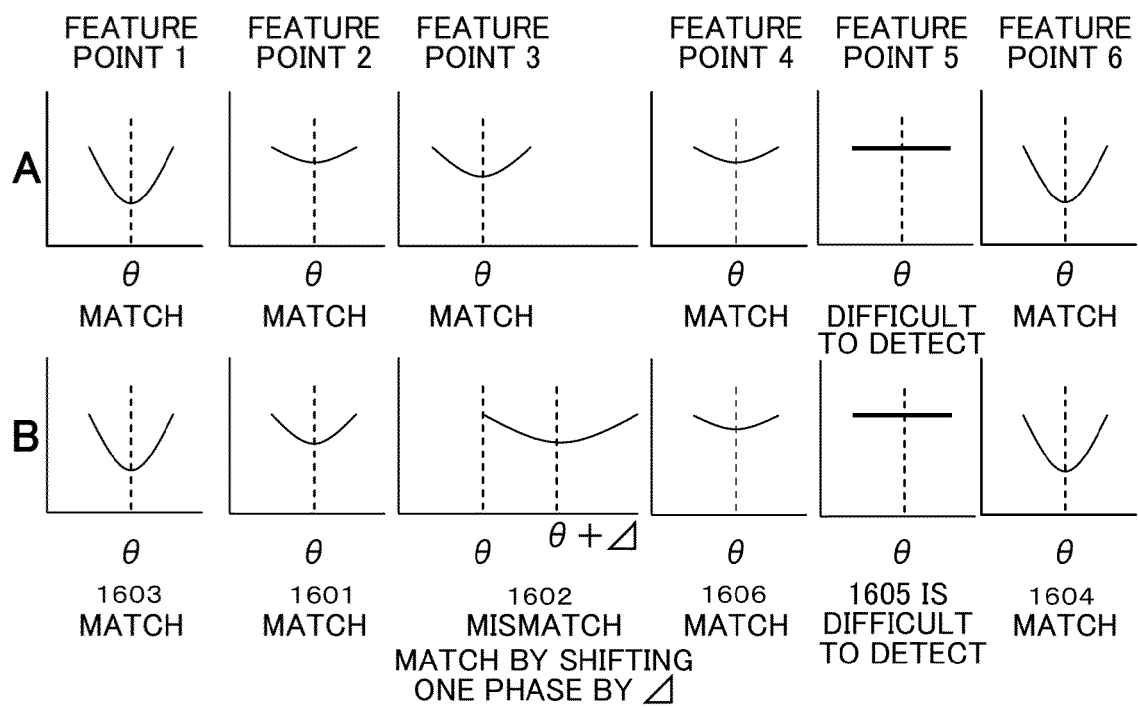

FIG.19
(A)
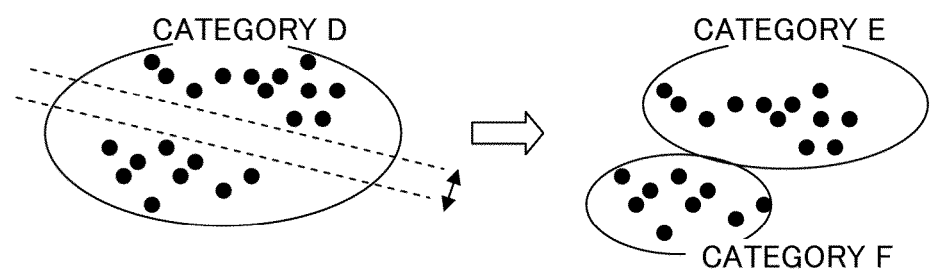
(B)
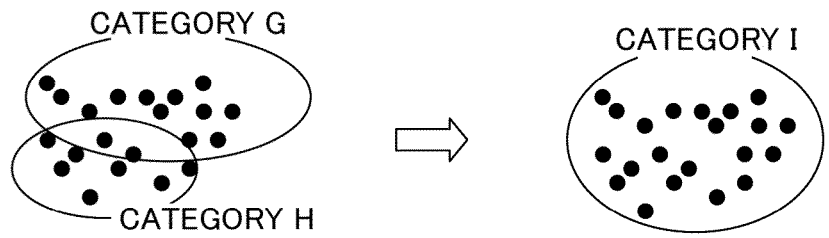
(C)
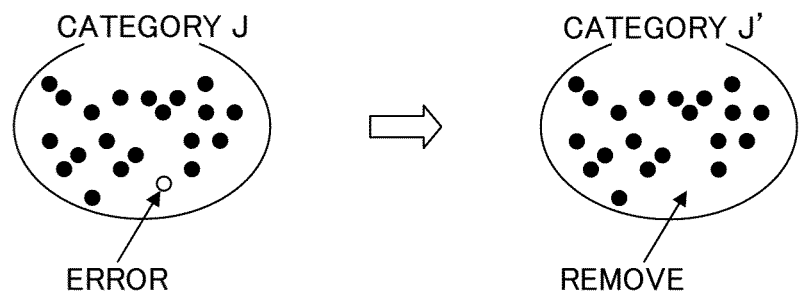

FIG.21
(A)
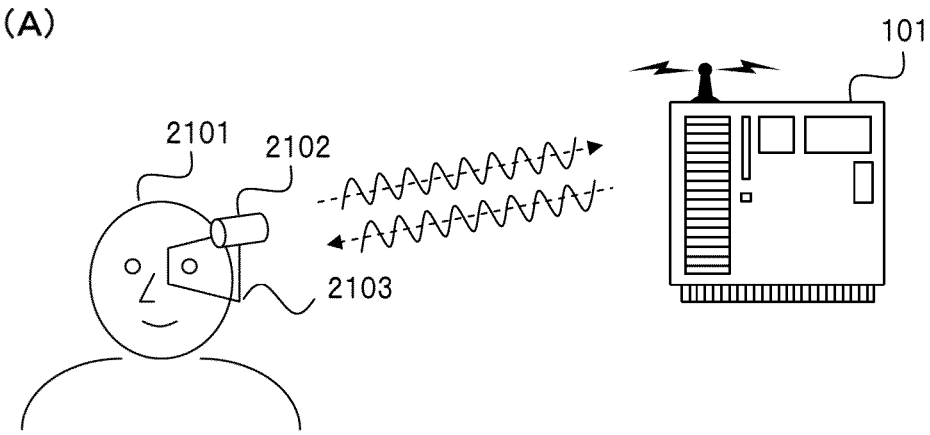
(B)
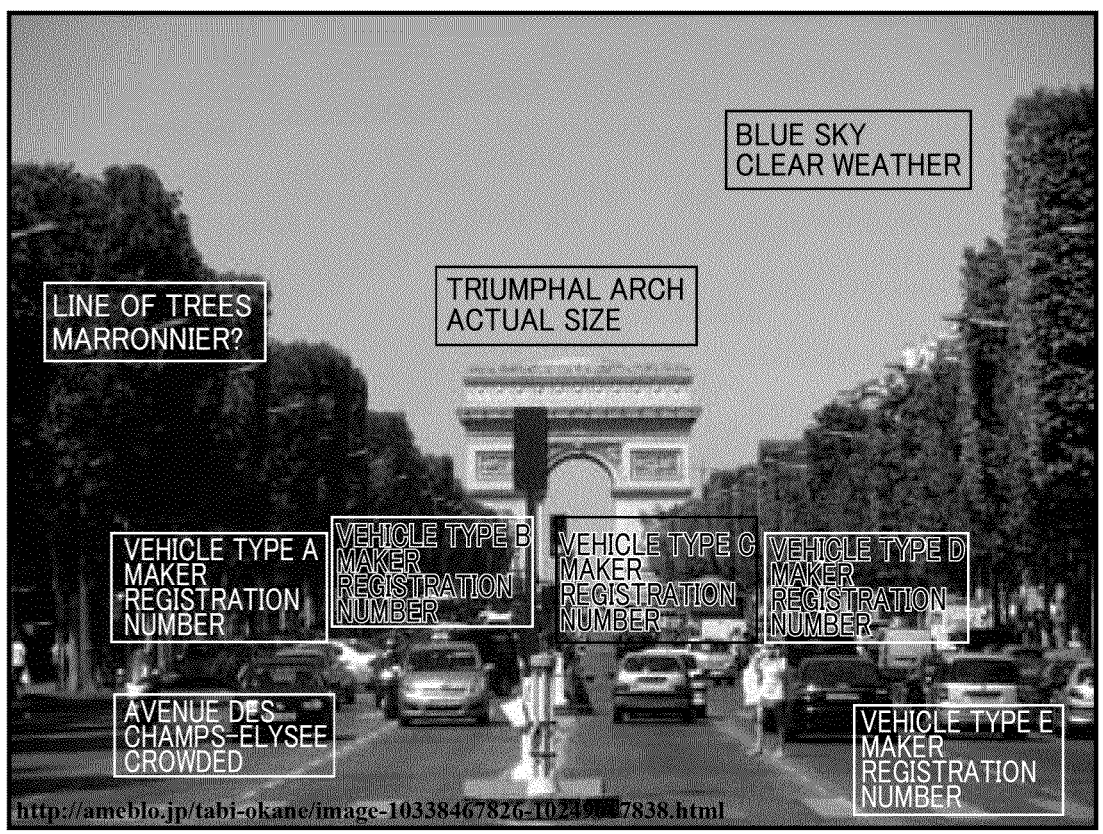

SERVER SYSTEM FOR REAL-TIME MOVING IMAGE COLLECTION, RECOGNITION, CLASSIFICATION, PROCESSING, AND DELIVERY

TECHNICAL FIELD

The present invention broadly relates to an image delivery system, and more particularly, to a server and a server system which perform processing such as collection, recognition, and classification of a moving image or the like uploaded in real time from a terminal (which is referred to as a client terminal or a client device. The same applies hereinafter.) and deliver the resultant data to a number of terminals in real time.

BACKGROUND ART

Particularly, with the advancement of a network technology and the spread thereof since 2000, a communication means between users has progressed from an electronic-mail, a web site, and a bulletin board system to a blog that allows individuals to easily dispatch information, a social networking service (SNS) that allows many users to exchange various opinions with one another, an instant messenger that includes many additional functions and pursues real time nature, and a video hosting service in which a number of users share moving images posted by an unspecified number of users and can exchange comments and the like.

For the development of a computer network technology, considerable efforts have been put into not only an improvement in a communication speed but also an improvement in a display technique of content on a network. For example, content posted on a web site has been initially described in a hypertext markup language (HTML), and then the markup language has evolved to an extensible markup language (XML) having a more extended function. From the mid-2000s, a technique of capable of dynamically executing a web application without accompanying screen transition which is called Ajax (Asynchronous Java (a registered trademark) Script+XML) has become recognized by the world. While the development, hardware has dramatically improved processing capabilities in all of personal computers, work stations, and supercomputers.

Meanwhile, in the world of computer entertainment, each company has applied its proprietary specification to a content display format, but hardware has evolved from an initial stand-alone video game machine to a network compatible home-use game machine with a high-performance processing engine.

Further, with the advancement of technology, a communication means on a network is evolving such that real time nature is further required in each operation environment.

Meanwhile, in the world of computer entertainment, real time nature and high-speed responsiveness have been pursued from early video game machines, and in recent home-use game machines, real-time computing has been improved in quality along with improvement in hardware performance, and for example, it is possible to render 3D graphics in real time.

As an example of an application to implement real time nature, there is an instant messenger. The instant messenger is under the assumption that a packet message transmitted from a certain user instantly arrives at a counterpart user except for a delay time (latency) caused by a physical restriction of a device. Further, a packet message transmitted or received with respect to an instant messenger includes relatively short text data, and thus real time nature is generally achieved.

Meanwhile, an electronic conferencing system has been obtained by developing the idea of an instant messenger. For example, a voice over IP (VoIP) is used in a remote conference on the Internet or a local area network (LAN). In recent electronic conferencing systems, it is possible to share a moving image as well as a text or a sound between a plurality of participants as information transmitted or received in real time.

For example, an invention disclosed in Patent Literature 1 is to provide a video conference system with a structure for enabling a smooth conversation progress even in a remote conference to be performed by a plurality of persons through a plurality of terminal devices. The video conference system includes a management table for managing users of a plurality of the terminal devices in a state that the users are classified into an interlocutor mode in which the progress of a specific agenda is centrally performed and a observer mode other than the interlocutors, and a communication control means for delivering information necessary for an interactive conversion to the terminal device of each user classified into the interlocutor mode, separately editing information by a medium selected among information associated with a conversation between the users classified into the interlocutor mode as delivery information, and then delivering the edited information to the terminal device of each user classified into the observer mode.

A problem that is desired to be solved by this invention is to realize a smooth conversation progress by limiting the number of receivers and callers in a limited communication band.

Further, a form in which a number of other users view a real-time interactive communication state between both parties is widely embodied even in an on-line game as a spectator mode.

In other words, the following invention has been proposed as an example of an application to realize real time nature in computer entertainment (Patent Literature 2).

An invention disclosed in Patent Literature 2 is to provide a communication game system that promotes communication between game players by providing various ways of playing, and the communication game system includes a game client system and a game server system that communicates with the game client system. The game server system includes a database that stores group information used to associate a plurality of game client systems as a competition group, and is configured to decide a competition combination from the game client systems belonging to the same competition group, manage transmission and receipt of data between the game client systems decided by the combination to execute a competition, and decide a next combination according to a result of the competition. Each game client system has a unique character selecting function and a function of chatting while viewing.

Particularly, data related to a game can be transmitted or received in real time, between game client systems whose opponents are decided among a plurality of game client systems, through the game server system, and each of the plurality of game client systems can chat with another game client system in a spectating state through the game server system while spectating a game.

This type of game sharing experience by a plurality of players mostly depends on performance of a game client system having powerful calculation resources and a memory, and it is still difficult to implement a real-time service of a game with high expressive power by a number of players only by a centric game server system and thin clients.

Further, as a communication means on a network develops, an infringement of portrait rights, a copyright infringement, uploads of harmful information or illegal content became a problem, and thus a protection technique of personal information and a removable technique of harmful content have become developed (Patent Literature 3).

An invention disclosed in Patent Literature 3 is to provide a new moving image censoring technique to solve a problem of a conventional moving image censoring technique by producing and displaying a thumbnail list by which moving image censorship including that of a copyright infringement and other criteria can be efficiently performed. Moving image data of a censorship target is divided into scenes, and various kinds of events included in input moving image data are detected. The detected events cause one or more thumbnail images to be extracted for each divided scene, and importance degrees on the extracted thumbnail images are calculated based on the detection result of the detected events. The extracted thumbnail images are rearranged in order of the calculated importance degrees and displayed in the form of a list. Thus, by displaying the thumbnail images extracted from the moving image data of the censorship target in order of the importance degrees in the form of a list, a time and effort to determine whether or not to open the images to the public can be alleviated, and the determination can be rapidly made.

In this invention, the determination is non-real time manual processing and thus is difficult to be applied to a system in which a number of moving images are uploaded in real time and re-delivered.

Further, with the recent spread of the Internet, the amount of information on a network has increased, and an information retrieval technique has advanced. For example, many portal sites having a powerful search engine are being run. Further, techniques of analyzing search keywords or access history of visitors and delivering web pages or advertisements that are to the visitor's preference have been developed, and marketing based on keywords used by visitors are being conducted.

For example, there has been proposed an information providing device capable of easily providing information useful for a user with a high degree of accuracy (Patent Literature 4). The information providing device includes an access history storage means that stores access frequency information representing the frequency with which a user has access to each content in association with user identification information identifying a corresponding user, an inter-user similarity calculating means that calculates an inter-user similarity indicating similarity of an access trend to content between users based on the access frequency information stored in the access history storage means, a content score calculating means that calculates a content score, which is information representing usefulness of content for users from the access frequency information of each user which is weighted by a similarity degree between users, an index storage means that stores the content score of each content calculated by the content score calculating means in association with the user identification information, a query input means that receives an input of a query including the user identification information which is transmitted from a communication the terminal device, a provision information generating means that acquires content identification information of content appropriate for the query received by the query input means, and generate provision information from the acquired content identification information with reference to the content score stored in the index storage means in association with the user identification information included in the query, and a provision information output means that outputs the provision information generated by the provision information generating means to the communication terminal device.

In this invention, a means of extracting each user's preference or action history, for example, using the user's interest degree using information, for example, image information other than information based on a language or a text is not provided.

Further, as studies related to image recognition by a computer, studies on various techniques for a general object recognition technique have been conducted (Non-Patent Literatures 1 to 4), and particularly, a technique called "Bag-of-Features" or "Bag-of-Keypoints" has been proposed in 2004 (Non-Patent Literature 5).

CITATION LIST

Patent Literature

Patent Literature 1: JP 2004-7561 A
Patent Literature 2: JP 2001-120841 A
Patent Literature 3: JP 2009-194491 A
Patent Literature 4: JP 2009-265754 A Non-Patent Literature Non-Patent Literature 1: Pinar Duygulu, Kobus Barnard, Nando de Freitas, David Forsyth, "Object Recognition as Machine Translation: Learning a lexicon for a fixed image vocabulary," European Conference on Computer Vision (ECCV), pp. 97-112, 2002.

Non-Patent Literature 2: R. Fergus, P. Perona, and A. Zisserman, "Object Class Recognition by Unsupervised Scale-invariant Learning," IEEE Conf. on Computer Vision and Pattern Recognition, pp. 264-271, 2003.

Non-Patent Literature 3: David G. Lowe, "Object Recognition from Local Scale-Invariant Features," Proc. IEEE International Conference on Computer Vision, pp. 1150-1157, 1999.

Non-Patent Literature 4: J. Sivic and A. Zisserman, "Video google: A text retrieval approach to object matching in videos," Proc. ICCV2003, Vol. 2, pp. 1470-1477, 2003.

Non-Patent Literature 5: G. Csurka, C. Bray, C. Dance, and L. Fan, "Visual categorization with bags of keypoints," Proc. ECCV Workshop on Statistical Learning in Computer Vision, pp. 1-22, 2004.

SUMMARY OF INVENTION

Problem to be Solved by the Invention

However, in a conventional electronic conferencing system or a communication system in an on-line match-up game, real time nature is realized to some extent. However, since a communication means on the premise of a predetermined scene (an electronic conference room or a field of a game) is provided, there are limits to what an unspecific number of participants perform real-time communication or a game in a two-way manner based on an enormous number of independent real-time moving images.

Meanwhile, even in the conventional instant messenger, real time nature is realized to some extent. However, a main information source thereof is a text or a sound, and thus it was not advanced enough to implement real-time communication using a moving image between an unspecific number of participants in a video telephone system on a network.

Further, in the conventional moving image sharing system, it is still difficult to manage an enormous number of uploaded moving images in real time.

Further, as a conventional technique related to use and management of copyrighted works, a method of embedding irremovable watermark information in a digital image or a moving image in package content has been used. However, it is difficult to apply the method to moving images posted from general users, and it was not advanced enough to perform real-time automatic detection analysis right handling on a specific object such as a copyrighted work in an image.

Further, in the conventional system, collection of reference history or access history is collection of access on the entire page performed in units of locations (URL or the like) of web pages. Thus, it is difficult to collect detailed interest information such as a portion of a moving image in which a visitor is interested. Further, market analysis based on a search keyword or a search query is information processing centering on a keyword selected by a user such as a calculation of a count of a keyword use frequency or relevance between keywords.

In this regard, the present invention is directed to provide a server system in which a number of users transmit or receive a moving image on a network in real time, a list of a large number of received moving images is automatically classified and then allowed to be selectively viewed by a user, real-time communication based on a moving image group is evoked between a number of users in the process of viewing and searching a specific object in a moving image or an image in which a user has interest in a coordination operation with an image recognition system including a copyright management system, user-specific marketing information or the like is acquired, an effective advertisement can be presented, and an effective service can be provided.

Means for Solving the Problem

A moving image collection/delivery server system according to the present invention accumulates moving images sequentially uploaded in real time via a network in a database, generates moving image thumbnails used to simultaneously display a plurality of moving images on a single display screen in real time, thereafter allocates the moving image thumbnails to a channel group adaptively generated from sequentially uploaded moving images, and delivers the moving image thumbnails to a terminal having a display and operating unit in real time via a network, wherein the sequentially generated moving image thumbnails are stored in an allocated channel in ascending order of shooting times and delivered to a plurality of terminals.

Furthermore, in the moving image collection/delivery server system according to the present invention, when a maximum intra-channel display number or a maximum intra-channel updatable display number of each terminal is exceeded, a moving image thumbnail which is oldest in a shooting time is replaced with a latest moving image thumbnail while maintaining a display position at a terminal, an original moving image group corresponding to a moving image thumbnail which has been replaced but not displayed is archived while maintaining time axis information, and a delivery is performed in order of shooting times based on a time axis of the original image group when an image reproduction request to trace back display time axis information is received from a terminal.

Furthermore, in the moving image collection/delivery server system according to the present invention, the maximum intra-channel updatable display number of each terminal is smaller than the maximum intra-channel display number, and a delivery is performed such that one or more moving image thumbnails that satisfy a specific condition are displayed on a display area of a difference between the maximum intra-channel updatable display number of each terminal and the maximum intra-channel display number.

Furthermore, in the moving image collection/delivery server system according to the present invention, when the updatable moving image thumbnail has a finite time length, a delivery is performed such that repetitive reproduction is performed in a terminal.

Furthermore, in the moving image collection/delivery server system according to the present invention, when an arbitrary moving image thumbnail in a moving image thumbnail group transmitted from the moving image collection/delivery server is selected at a terminal, a detailed moving image according to a resolution of a corresponding terminal is transmitted.

Furthermore, in the moving image collection/delivery server system according to the present invention, the moving image data is classified into a plurality of channels using an image recognition process including detection of an object in an image, transmission position information, a transmitter, and attribute information including metadata or an attention degree, and a delivery to a terminal is performed via a network in units of channels or units of new channel groups obtained by further reconfiguring a plurality of channels.

Furthermore, in the moving image collection/delivery server system according to the present invention, in addition to the generated channel group, a response by a text, a symbol, a sound, a still image, or a moving image is received from a terminal in connection with a moving image related to a specific transmitter, a specific object, or a specific location, and then a re-delivery is performed.

Furthermore, in the moving image collection/delivery server system according to the present invention, when a specific image is detected by performing image analysis including detection of an object in an image on the moving image data and/or when copyright management information related to a corresponding image is detected, a delivery of all moving image data including a corresponding image is suspended, and a filter process is performed on the specific image.

Furthermore, in the moving image collection/delivery server system according to the present invention, in the moving image collection/delivery server, two or more configurations of a simultaneous displayable number of moving image thumbnails in a channel are prepared according to a display capability and a processing capability of a terminal and used as an image transmission unit, and the terminal simultaneously receives two or more image transmission units and is allowed to smoothly scroll within a channel.

Furthermore, in the moving image collection/delivery server system according to the present invention, the moving image collection/delivery server is configured to be capable of transmitting each moving image thumbnail as an independent element in order to allow a terminal side to adaptively re-configure a maximum display number and a display layout of a moving image thumbnail according to a display capability and a processing capability of a terminal.

Furthermore, in the moving image collection/delivery server system according to the present invention, a user's attribute and action history extracted from a moving image selected by an individual user on a terminal, a target object in a moving image, a selection order, a moving image uploaded by an individual user, and an attention object in a moving image is accumulated in an information collection processing system.

Furthermore, in the moving image collection/delivery server system according to the present invention, an information group to increase a user's convenience and interest such as a recommendation or an advertisement generated based on the user's attribute and action history extracted by the information collection processing system can be presented to an individual user.

Furthermore, in the moving image collection/delivery server system according to the present invention, a viewer's attention is drawn to a moving image thumbnail at the time of swapping-in and swapping-out by adding a decoration process of changing brightness of an entire moving image thumbnail, giving a blinking animation effect by applying a specific color to an edge portion of a moving image thumbnail, or giving an animation effect by arranging various patterns on a moving image thumbnail as a display process when a moving image thumbnail is swapped in or swapped out.

Effects of the Invention

In the server and the server system according to the present invention, real time nature and information density of communication including an unspecified number of users are high, and thus real-time sharing experience is possible between an unspecified number of users unlike an indirect and loose communication tool of a conventional instant messenger or moving image sharing system.

In addition, due to real time nature and an image information processing capability of the server and the server system according to the present invention, in a service in which content is simultaneously delivered to a number of terminals on a network, an adaptive and rapid copyright management process can be implemented. In addition, marketing information or an advertisement including a moving image can be more effectively and dynamically delivered in real time to a terminal of a specific user or terminals of a user group.

Furthermore, due to real time nature and an image information processing capability of the server and the server system according to the present invention, even in a number of monitoring camera systems present on a network, real-time automatic detection/recognition of a plurality of specific objects or an unidentified object can be performed in units of individual moving image streams.

BRIEF DESCRIPTION OF THE DRAWINGS

FIG. 1 is an explanatory view for describing a system configuration in an embodiment of a moving image collection/delivery server system according to the present invention.

FIG. 6 is an explanatory view for describing a concept of channel group generation in an embodiment of the system according to at least one embodiment of the present invention.

FIG. 14 is an explanatory view for describing a process concept in an embodiment of the system according to at least one embodiment of the present invention.

FIG. 15 is an explanatory view for describing a process concept in an embodiment of the system according to at least one embodiment of the present invention.

FIG. 18 is an explanatory view for describing a specific object recognition process in an embodiment of the system according to at least one embodiment of the present invention.

FIG. 19 is an explanatory view for describing a process concept in an embodiment of the system according to at least one embodiment of the present invention.

FIG. 21 is an explanatory view for describing another concrete example in which an information group to increase a user's convenience and interest is presented to an individual user in an embodiment of the system according to at least one embodiment of the present invention.

DESCRIPTION OF EMBODIMENTS

Figure 2A:
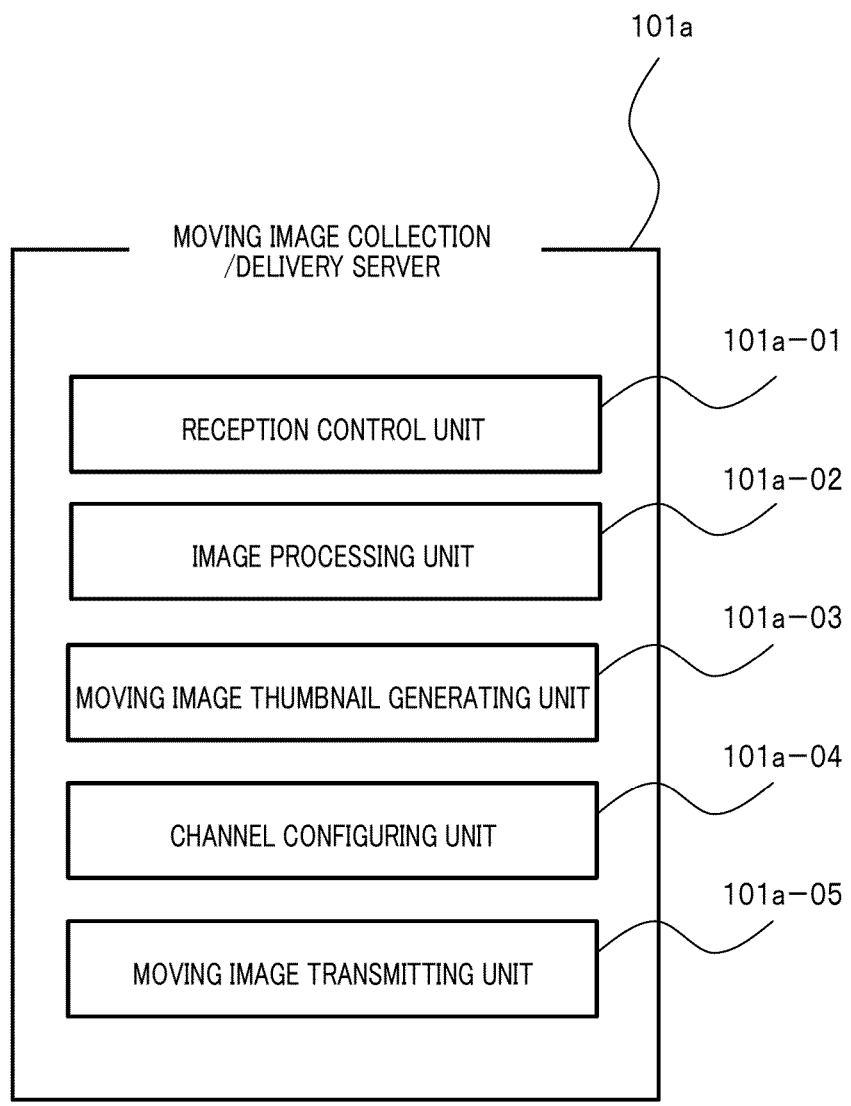
FIG. 2A is an explanatory view for describing a functional block of a moving image collection/delivery server in an embodiment of the system according to at least one embodiment of the present invention.

Hereinafter, embodiments for embodying the moving image collection/delivery server system according to the present invention will be described.

FIG. 1 illustrates a configuration example of the moving image collection/delivery server system according to the present invention. The system 100 includes a moving image collection/delivery server 101a, a moving image manager 101b, a database (DB) including a moving image archive 101c and a metadata/position data etc. DB 101d, a real-time image recognition system 102, a mother database (hereinafter, referred to as a "MDB") 103, and terminal devices 105a to 105d used by users. The moving image collection/delivery server 101a, the moving image manager 101b, the real-time image recognition system 102, and the mother database 103 are connected to each other with a network line, and the moving image collection/delivery server 101a and the terminal 105 are connected to a network or the Internet 104.

Here, the moving image collection/delivery server 101a, the moving image manager 101b, the moving image archive 101c, the metadata/position data etc. DB 101d, the real-time image recognition system 102, and the MDB 103 constitute a moving image collection/delivery server system 101. In other words, each of functions of the moving image manager 101b, the moving image archive 101c, the metadata/position data etc. DB 101d, the real-time image recognition system 102, and the MDB 103 may be integrated into the moving image collection/delivery server 101a. In the following, in order to help with understanding, in the present embodiment, the description will be made in connection with a server system group in which functions are shared.

In the present invention, the mother database refers to a database in which cognitive processing or knowledge processing of a human being is applied to a computer. That is, the mother database is obtained by integrating vast knowledge as a database on a computer system, further evolving the database by learning (AI), and by involving time axis information, thereby allowing referring to or moving in four-dimensional (4D) time and space.

Further, all network lines and connections are bi-directional. In FIG. 1, the terminals 105a to 105d are configured to be capable of uploading a moving image and performing streaming reception.

The server is configured with a computer system and has a configuration of an electronic computer including an arithmetic and logical unit, a control unit, a storage device, and an input/output (I/O) device which are connected via a command bus and a data bus as a basic configuration. The arithmetic and logical unit executes an arithmetic operation, a logical operation, a comparison operation, a shift operation, and the like based on information (bit data) input from the I/O device through an I/O interface. The executed data is stored in the storage device as necessary, and output from the I/O device. A series of processes is controlled by a software program stored in the storage device.

The server or the terminal according to the present invention is hardware including a basic function as the above-described computer and is controlled by a program group including an operating system, a device driver, and application software. However, a terminal having a limited function, the role of the computer can be replaced with hardware as a fixed function.

FIG. 2A illustrates functional blocks of the moving image collection/delivery server in an embodiment of a system according to the present invention. The moving image collection/delivery server 101a includes a reception control unit 101a-01, an image processing unit 101a-02, a moving image thumbnail generating unit 101a-03, a channel configuring unit 101a-04, and a moving image transmitting unit 101a-05. The functional blocks of the moving image collection/delivery server 101a need not be necessarily limited to the above components, but representative functions thereof will be shortly described.

The reception control unit 101a-01 gives a notice about whether or not a moving image uploaded from the terminal 105 is receivable. The image processing unit 101a-02 performs transcoding process of converting into a common format and a normalization process on input moving images encoded by various moving image formats in order to efficiently perform subsequent moving image processing and accumulation. The moving image thumbnail generating unit 101a-03 converts the moving image converted by the image processing unit 101a-02 into a compressed moving image thumbnail, and performs a filtering process and the like. The channel configuring unit 101a-04 manages a channel, and performs a clustering process of a channel or a process of tiling (pasting) a moving image thumbnail to a channel. The moving image transmitting unit 101a-05 performs a process of delivering a plurality of channels configured by the channel configuring unit 101a-04 to a plurality of terminals 105 via a network.

Figure 2B:
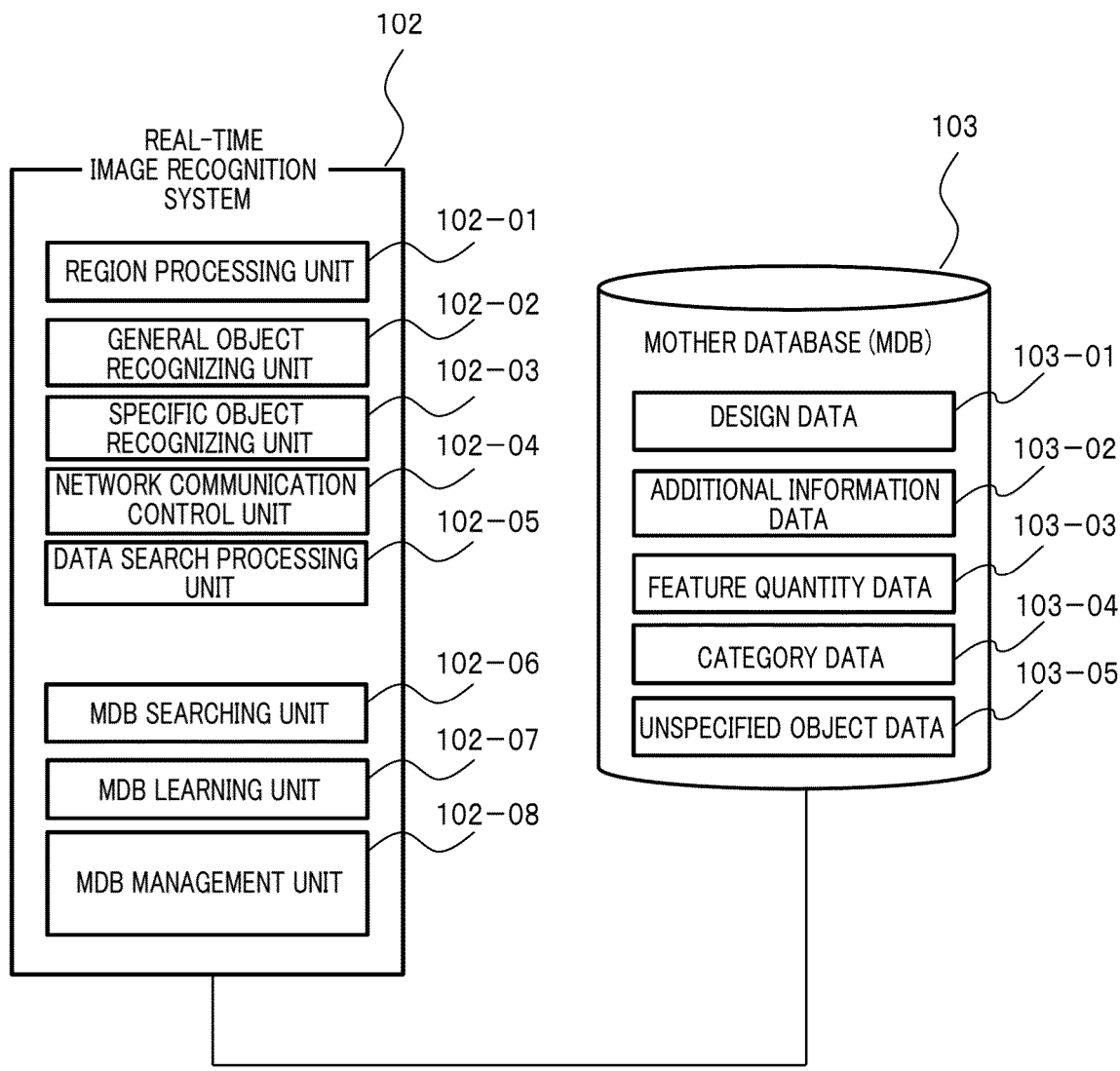
FIG. 2B is an explanatory view for describing a functional block of a real-time image recognition system and mother database in an embodiment of the system according to at least one embodiment of the present invention.

FIG. 2B illustrates functional blocks of the real-time image recognition system and the MDB in an embodiment of the system according to at least one embodiment of the present invention. The real-time image recognition system 102 includes a region processing unit 102-01, a general object recognizing unit 102-02, a specific object recognizing unit 102-03, a network communication control unit 102-04, a data search processing unit 102-05, an MDB searching unit 102-06, an MDB learning unit 102-07, and an MDB management unit 102-08. The functional blocks of the real-time image recognition system 102 need not be necessarily limited to the above components, but representative functions thereof will be shortly described.

The region processing unit 102-01 performs a region division in an image, excision of a partial image, and the like. The general object recognizing unit 102-02 recognizes an object included in an image by a general name (category). The specific object recognizing unit 102-03 identifies an object with reference to information registered in the MDB. The network communication control unit 102-04 performs an input/output (I/O) process of an image, information communication control to a terminal, and the like. The data search processing unit 102-05 collects information from a link destination and performs inquiry of collective intelligence, collection, search, or the like. The MDB searching unit 102-06 searches for tag data of a name of an object or the like. The MDB learning unit 102-07 performs addition of new design data, addition of detailed information, registration of time information, registration, updating, and addition of additional information, and the like. The MDB management unit 102-08 performs extraction of a feature point or a feature quantity from design data, extraction of category information from additional information, registration of category information extracted as category data, extension, division, updating, integration, and revision of category classification of category data, registration of a new category, and the like.

The MDB 103 includes design data 103-01, additional information data 103-02, feature quantity data 103-03, category data 103-04, and unspecified object data 103-05. The components of the MDB 103 are not limited to the above-mentioned components, but representative functions thereof will be shortly described.

The design data 103-01 retains basic information which is generated from a database used to configure or manufacture an object and necessary to configure or manufacture an object such as the structure, the shape, and a dimension of an object, connection information of parts, a layout diagram, a moving element, a moving range, the weight, and stiffness.

The additional information data 103-02 retains all of information related to an object such as a name of an object, a manufacturer, a part number, a time and date, a material, a composition, and processing information.

The feature quantity data 103-03 retains information of a feature point or a feature quantity of each generated object based on design information.

The category data 103-04 retains information used when the general object recognizing unit performs category classification of an object.

The unspecified object data 103-05 retains information of an object which is difficult to be specified at the present time.

Figure 3:
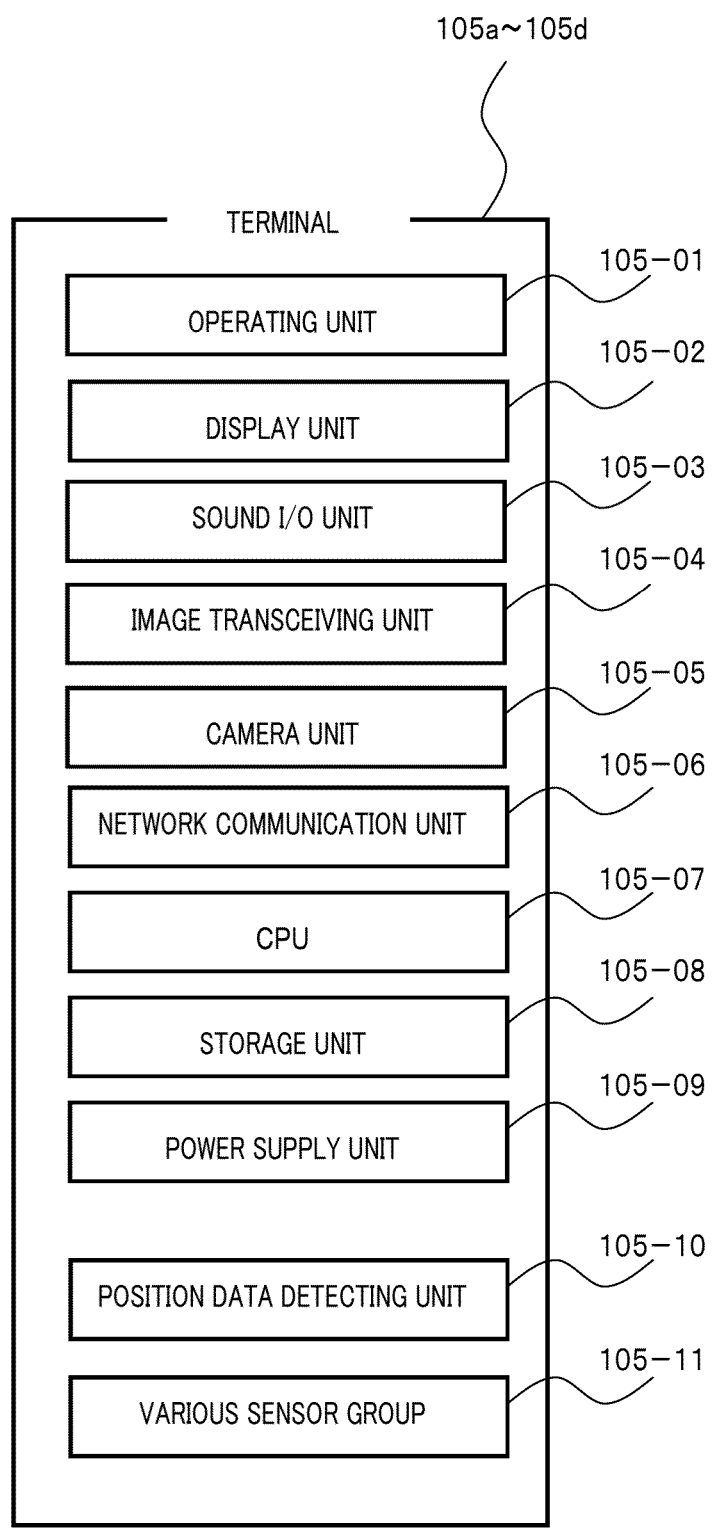
FIG. 3 is an explanatory view for describing a functional block of a terminal in an embodiment of the system according to at least one embodiment of the present invention.

FIG. 3 illustrates a terminal in an embodiment of the system according to the present invention. Each of the terminals 105*a* to 105*d* is a client terminal device used by users in a broad meaning and includes a computer, a portable information terminal (PDA), a mobile telephone, and the like. In other words, FIG. 1 illustrates a state in which various kinds of electronic information devices are connected to a network such as the Internet as the terminals 105*a* to 105*d*. In the following, when simply the terminal 105 is described, the terminal 105 represents any one of the terminals 105*a* to 105*d* connected to a network. Of course, the terminals 105*a* to 105*d* need not be necessary of the same type. The terminals 105*a* to 105*d* may be terminal devices having equivalent functions (or minimum executable functions). The terminal 105 is not limited to the following example, but representative functional blocks of the terminal 105 will be described.

The terminal 105 includes an operating unit 105-01, a display unit 105-02, a sound I/O unit 105-03, an image transceiving unit 105-04, a camera unit 105-05, a network communication unit 105-06, a CPU 105-07, a storage unit 105-08, a power supply unit 105-09, a position data detecting unit 105-10, and a group of various sensor group 105-11.

For example, the operating unit 105-01 is configured with input devices such as a touch pad (including a display built-in type), a key input unit, a pointing device, and a jog dial. The display unit 105-02 is a display unit having the resolution and a video memory which support various devices. The sound I/O unit 105-03 is configured with an I/O device such as a microphone for sound recognition or a speaker. The image transceiving unit 105-04 includes a codec unit, a memory unit, and the like, which are necessary to transmit moving image data captured by the terminal 105 to the server or to receive moving image data delivered from the server. The moving image data includes a still image as well. The camera unit 105-05 is an optional component and is an image capturing unit including a device such as a charge coupled device (CCD). The network communication unit 105-06 is an interface used to make a connection to a network such as the Internet in a wired or wireless manner.

The CPU 105-07 is a central processing unit, and the storage unit 105-08 is a storage device such as a hard disk or a memory. The power supply unit 105-09 includes a battery and the like.

The position data detecting unit 105-10 is a position information detecting device such as a global positioning system (GPS), and the various sensor group 105-11 includes an acceleration sensor, an inclination sensor, a magnetic sensor, and the like.

Figure 4A:
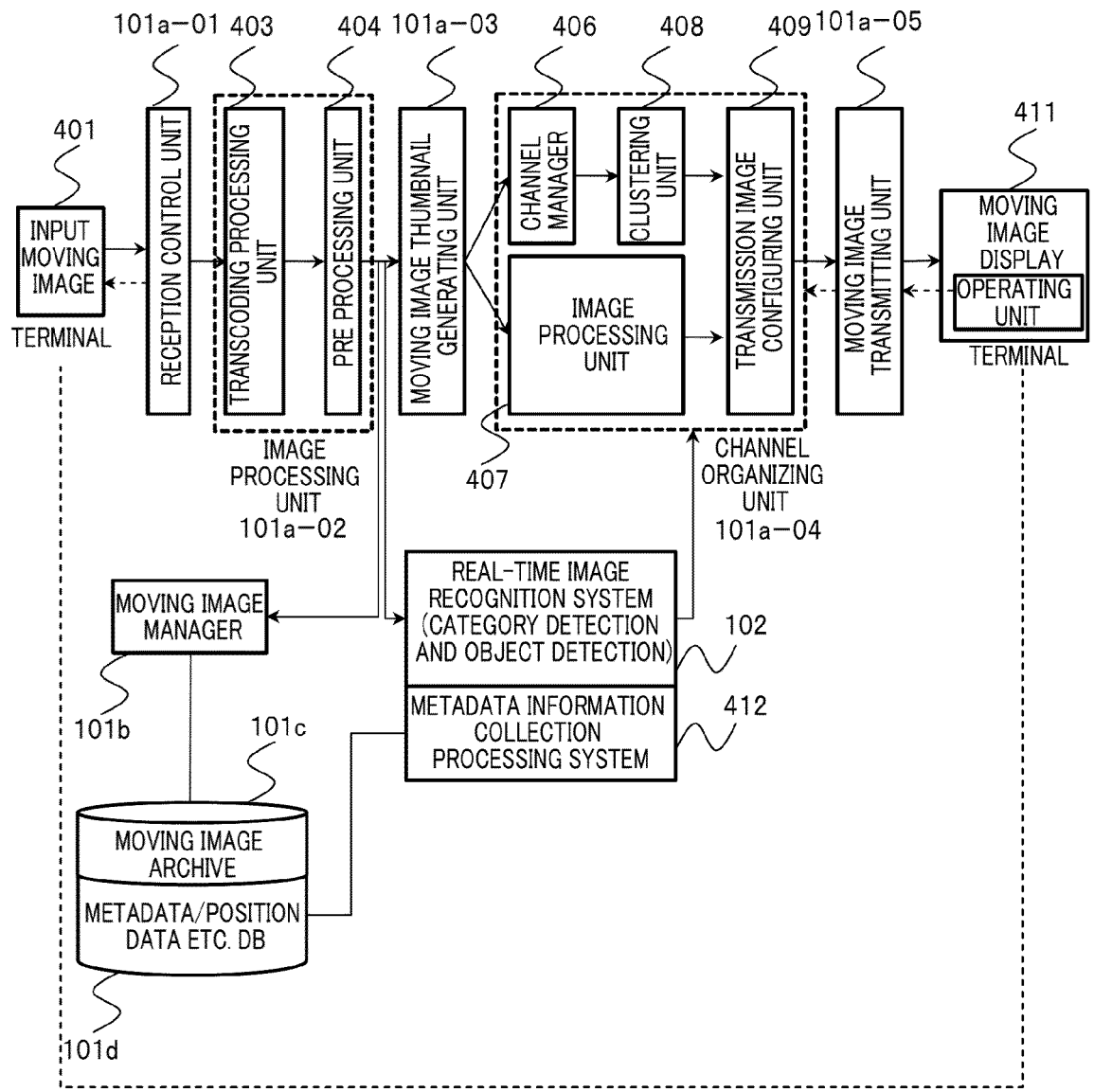
FIG. 4A is an explanatory view for describing a system configuration and a process flow in an embodiment of the system according to at least one embodiment of the present invention.

FIG. 4A illustrates a processing flow until a user causes a moving image uploaded from another user to be displayed on a terminal.

Referring to FIG. 4A, a moving image is uploaded from a terminal 401. The reception control unit 101*a*-01 gives a notice about whether or not a moving image uploaded from the terminal 401 is receivable. The reception control unit 101*a*-01 includes a device for avoiding or rejecting unauthorized access (a denial of service (DOS) attack, a file including a virus, or the like) to the server.

Next, a transcoding processing unit 403 of the image processing unit 101*a*-02 converts input moving images encoded in various moving image formats into a common internal format in subsequent processing. In addition, the moving image converted by the image processing unit 101*a*-02 is archived in the moving image archive 101*c* by the moving image manager 101*b*. Further, extraction processing of metadata, position data, or the like is performed, and resultant data is archived in the metadata/position data etc. DB 101*d*.

Next, the moving image converted into the common format in the transcoding processing unit 403 is transferred to a pre processing unit 404 of the image processing unit 101*a*-02, and the normalization process is performed on the moving image.

The moving image processed by the pre processing unit 404 is converted into a compressed moving image thumbnail in the moving image thumbnail generating unit 101*a*-03. An image processing unit 407 of the channel organizing unit executes, for example, an appropriate filtering process on the compressed moving image thumbnail based on information from the real-time image recognition system 102 and a metadata information collection processing system 412 working together therewith (the details will be described later).

In parallel with processing in the image processing unit 407, a channel manager 406 of the channel organizing unit 101*a*-04 assigns an appropriate channel to an input moving image thumbnail group using relevance information by the real-time image recognition system 102 and the metadata information collection processing system 412. Alternatively, when there is no existing appropriate channel, a new channel is generated.

Next, a transmission image configuring unit 409 of the channel organizing unit 101*a*-04 decides the layout (a number and a position) of moving image thumbnails in a channel. The moving image transmitting unit 101*a*-05 transmits a channel group organized in the transmission image configuring unit 409 to a plurality of terminals.

Here, in the structure of the moving image thumbnail in the channel configured in the transmission image configuring unit 409, there is a case in which a channel is used as a display frame unit at the terminal side and a case in which the channel is divided into a plurality of display frame groups and the terminal side switches or scrolls the display frame groups to be displayed when a display area at the terminal side is too small to display a whole channel.

As a method of transmission to the terminal, there may be employed either a method (m1) of re-configuring a plurality of moving image thumbnails to be configured within a display frame as one stream moving image together, compressing the stream moving image, and transmitting the stream moving image, and a method (m2) of dividing each moving image thumbnail into micro content, transmitting the micro content, and re-configuring a display frame at the terminal side.

According to the former method (m1), when each channel moving image is transmitted to the terminal, since a plurality of moving image thumbnails are re-compressed into one frame, there is an advantage that processing overload at the terminal side can be alleviated, but a degree of freedom of an image display at the terminal side is restricted.

According to the latter method (m2), since each moving image thumbnail configuring a channel is divided into micro content and then the micro content is individually transmitted to the terminal, sorting, enlargement, reduction, and highlighting of each moving image thumbnail are performed at the terminal side using a web browser and so on, and so there is an advantage that a degree of freedom of a display is high. However, it is necessary for the terminal side to re-configure the micro content which is subdivided and then transmitted as an aggregation of moving image thumbnail groups of the same time of day.

Here, various operations can be made on a display moving image through an operating unit in a terminal 411. For example, when a detailed moving image corresponding to a plurality of moving images is displayed, a corresponding command is transferred to the channel organizing unit 101a-04 through the moving image transmitting unit 101a-05, the transmission image configuring unit 409 acquires a non-reduced detailed moving image having a tile number of 1 from the moving image archive 101c, and the detailed moving image is transmitted through the moving image transmitting unit 101a-05.

Figure 4B:
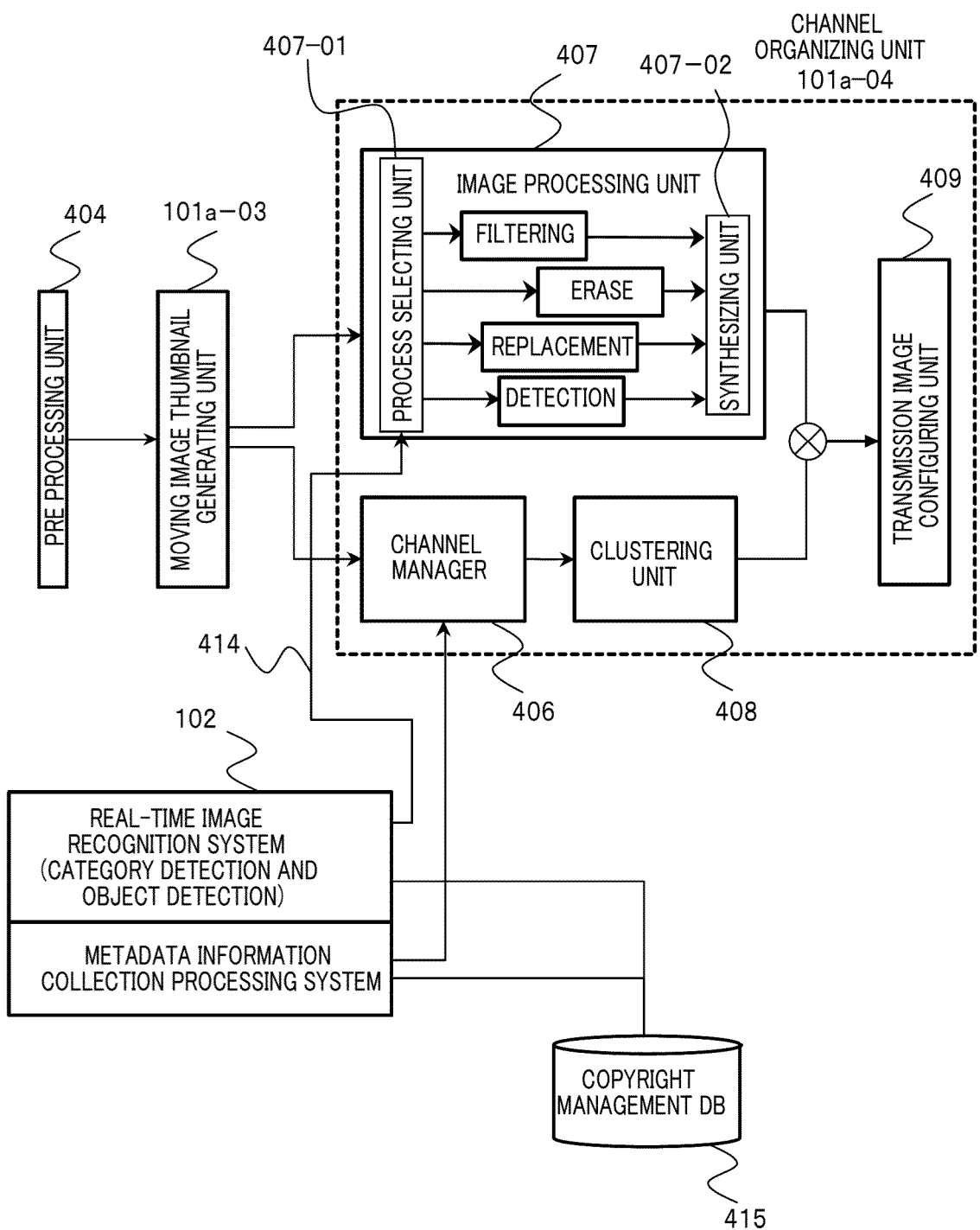
FIG. 4B is an explanatory view for describing a system configuration and a process flow in an embodiment of the system according to at least one embodiment of the present invention.

Next, a process performed around the channel organizing unit 101a-04 of FIG. 4A will be described in further detail with reference to FIG. 4B.

The real-time image recognition system 102 generates a moving image thumbnail through the moving image thumbnail generating unit 101a-03 from the moving image processed by the pre processing unit 404, and performs category detection by general object recognition which will be described later, specific object detection by specific object recognition, and the like. In case of a specific object, access to a copyright management DB 415 is made to acquire appropriate copyright management information, and the following control is performed on the image processing unit 407.

In other words, specifically, control is performed on a process selecting unit 407-01 of the image processing unit 407 such that with respect to all specific objects with the acquired copyright management information assigned thereto in the moving image processed by the pre processing unit 404, suspension of moving image delivery, a filtering process (gradation or the like) on an individual object that becomes problematic, a replacement process with another masking image, and the like are recursively performed for each specific object with the copyright management information assigned thereto based on the acquired copyright management information. After the respective processes are executed, the synthesizing unit 407-02 executes all necessary image processing on an original image, and then transfers the finally synthesized image to the transmission image configuring unit 409 through the clustering unit 408.

A system configuration and a processing flow in an embodiment of the system according to the present invention will be described in further detail with reference to FIG. 4C.

Figure 4C:
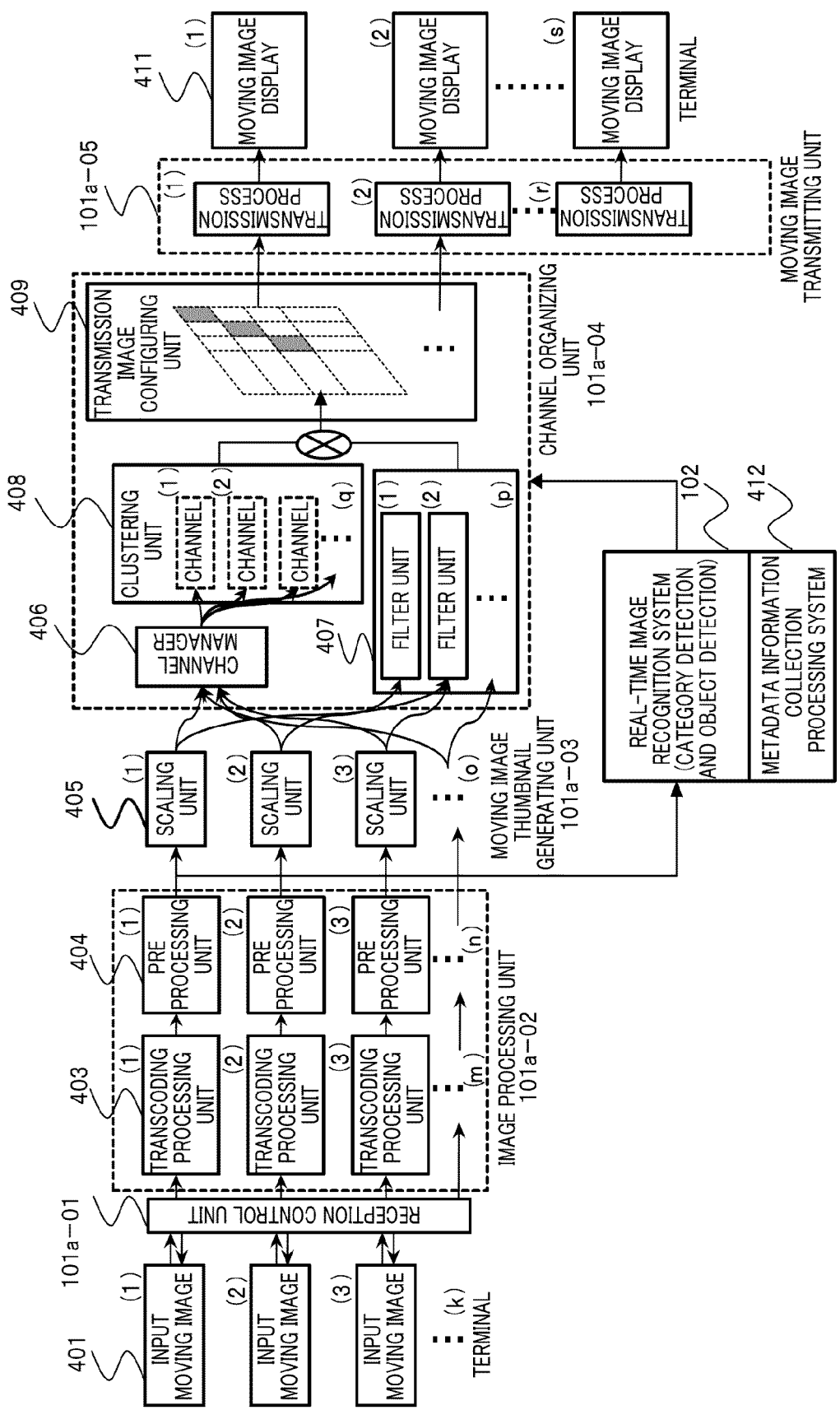
FIG. 4C is an explanatory view for describing a system configuration in an embodiment of the system according to at least one embodiment of the present invention.

FIG. 4C is a diagram for describing a parallel processing configuration example of a system block in FIG. 4A. Referring to FIG. 4C, the image processing unit 101a-02 includes the transcoding processing unit 403 of a parallel number m and the pre processing unit 404 of a parallel number n, and the moving image thumbnail generating unit 101a-03 includes a scaling unit 405 of a parallel number o.

Similarly, the channel organizing unit 101a-04 includes the filter unit 407 of a parallel number p, and the clustering unit 408 dynamically generates channels 1 to q. The filter unit 407 of the parallel number p is subjected to parallel processing as well.

A sufficient number corresponding to a processing speed at which the channels 1 to q are organized in the clustering unit 408 is prepared as the parallel number p of the filter unit 407.

In addition, a channel image configured by the transmission image configuring unit 409 is transmitted to a number of terminals in parallel through a transmission processing unit of a parallel number r disposed in the image transmitting unit 101a-05.

Here, even in the real-time image recognition system 102 of FIG. 4C, parallel processing is performed in a processing system with a parallel processing configuration based on a recognition algorithm of each specific object (not illustrated in FIG. 4C). A processing module implemented in the real-time image recognition system 102 has a parallel number in which processing is performed at a higher speed than parallel processing in the filter unit.

As a result, input moving images 1 to k input by a number of terminals in FIG. 4C are delivered to a number of terminals as moving image displays 1 to s without any pause through parallel processing by the respective modules with a parallel processing configuration in the server system.

Figure 5A:
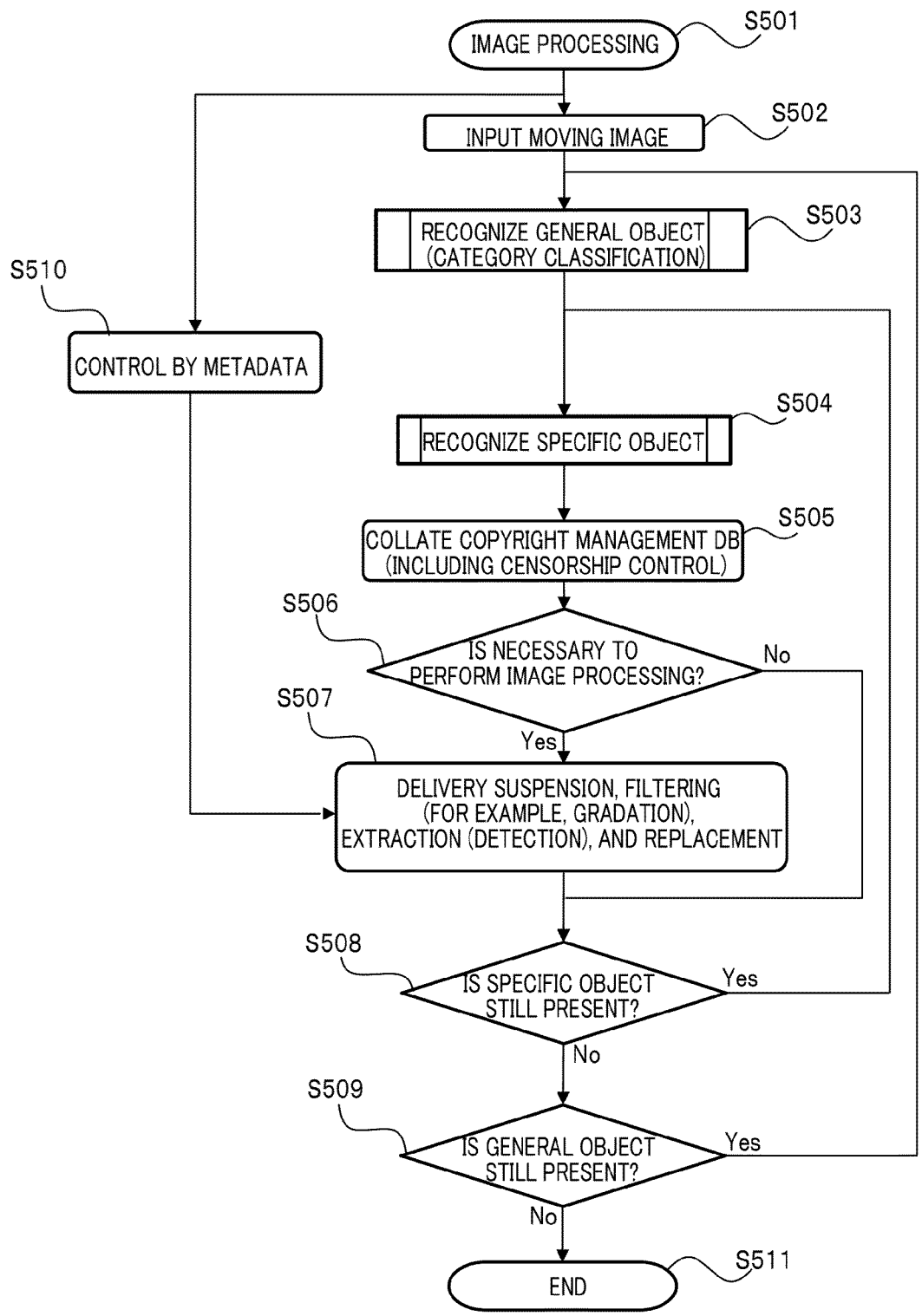
FIG. 5A is an explanatory view for describing the flow of a filtering process in an embodiment of the system according to at least one embodiment of the present invention.

FIG. 5A is the flow of filtering processes performed by the moving image collection/delivery server in an embodiment of the system according to the present invention.

In S501, the filtering process or the like starts as image processing. Next, in S502, when a moving image (described above) of a common internal format generated from a moving image uploaded from the terminal 105 is input, general object recognition (S503) and specific object recognition (S504) are performed through the real-time image recognition system 102. Thereafter, in S505, an object recognition result is collated in the copyright management DB 415.

It is determined whether or not it is necessary to perform image processing a target object in an uploaded moving image based on censorship management information related to a moving image together with the above copyright management information (S506).

Here, when it is determined in S506 that it is necessary to perform image processing in light of a moving image infringing a copyright or censorship, the process proceeds to S507, suspension of delivery of the entire moving image, a filtering process (gradation or the like) on an individual object that becomes problematic, a replacement process with another masking image, and the like are executed. In addition, it is possible to extract a specific image using these image processing. As a result, for example, the user can detect a specific object in a moving image, and a copyright holder and the like can monitor a target copyrighted work and the like in real time.

A series of processes described above is performed on all detected specific objects and a general object (S507, S508, and S509), and then image processing ends (S511).

Meanwhile, a management process of a copyright or the like according to the present invention includes a process by the above-described image recognition process and a process by a copyright management process (S510) based on metadata acquired separately from a moving image, metadata embedded in a moving image, or the like, and suspension of delivery of the entire moving image, a filtering process (gradation or the like) on an individual object that becomes problematic, a replacement process with another masking image, and the like are executed (S507).

Figure 5B:
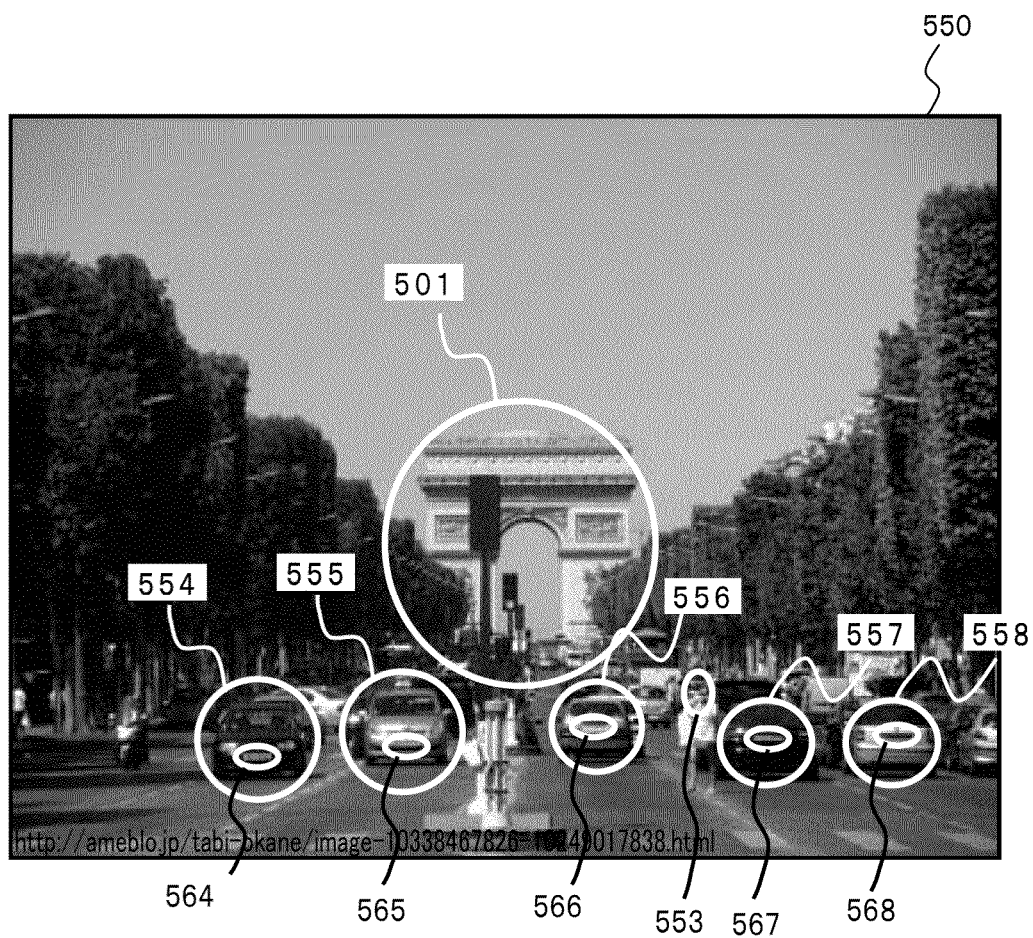
FIG. 5B is an explanatory view for describing a concrete example of a filtering process in an embodiment of the system according to at least one embodiment of the present invention.

FIG. 5B illustrates a concrete example of the filtering process described with reference to FIG. 5A. Referring to FIG. 5B, a scene 550 is an upload moving image, and a triumphal arch 501 is recognized over a long distance. A number of running automobiles are detected on a road, and a plurality of persons are also detected.

In the moving image 550, two categories, that is, a human face 553 and automobiles 554 to 558 are detected by the process of general object recognition S503 in FIG. 5A, and the triumphal arch 501 is detected by the process of specific object recognition S504. For a plurality of automobiles recognized as general objects, models of the automobiles can be specified by subsequent specific object recognition, and license plates 564 to 568 can be detected and recognized.

In the above example, the gradation process can be performed on the human face 553 recognized as a general object and the license plates 564 to 568 recognized as the specific objects.

In addition, the server and the server system according to the present invention have the real-time nature and the image/information processing capability and thus can be applied to a number of monitoring camera systems present on a network. In this case, a plurality of specific objects or unidentified objects can be automatically detected and recognized in real time in units of individual moving image streams.

FIG. 6 is a conceptual diagram of channel group generation processed in the moving image collection/delivery server 101a.

Referring to FIG. 6, moving images are uploaded to the moving image collection/delivery server 101a from the terminals 105a to 105d. For example, a moving image C1 obtained by capturing an automobile, a moving image C2 obtained by capturing a cat, and a moving image C3 obtained by capturing a dog are uploaded in order from the terminal 105a. Further, a moving image C4 obtained by capturing a human and a moving image C5 obtained by capturing a soccer game are uploaded in order from the terminal 105b. Further, a moving image C6 obtained by capturing a specific tourist spot, a moving image C7 obtained by capturing a dog, and a moving image C8 obtained by capturing a human are uploaded in order from the terminal 105c. In addition, a moving image C9 obtained by capturing an automobile and a moving image C10 obtained by capturing a cat are uploaded in order from the terminal 105d. In FIG. 6, shooting date and time are assigned to the uploaded moving images C1 to C10.

In FIG. 6, the moving images uploaded to the moving image collection/delivery server 101a are assigned one dog channel (CH1), two cat channels (CH2), one automobile channel (CH3), three human channels (CH4), and one event channel (CH5), and delivered to a number of terminals (including the terminals 105a to 105d).

Next, an example of dynamic generation, division, and integration processes of a channel will be described below.
[New Channel Generation]

(1) For example, a moving image group which a number of users start to upload in the same theme or a latest moving image group viewed by a number of users is generated as a new channel.

(2) Meanwhile, when viewing of a certain channel by a new upload or users is reduced, a transmission service may be terminated, and thus a dynamic adaptive operation can be performed.
[Channel Division]

When the number of moving images registered to an existing channel is larger than a maximum intra-channel moving images storable number, a channel can be divided into sub categories using parameters such as time series, a place, and an attribute and extended as a plurality of channel groups.

When a channel division number is larger than a maximum deliverable number of the moving image collection/delivery server, a load of the moving image collection/delivery server can be maintained within a predetermined range by making an evaluation based on an attention degree order, an update frequency, and a shooting time and performing transmission preferentially from an upper-level channel group.
[Generation of List Channel]

In addition, as illustrated in FIG. 6, by extracting a moving image thumbnail representing each channel, a list channel which is an aggregation thereof can be generated. The list channel can increase a panoramic view property of a number of dynamically generated channels.

Figure 7A:
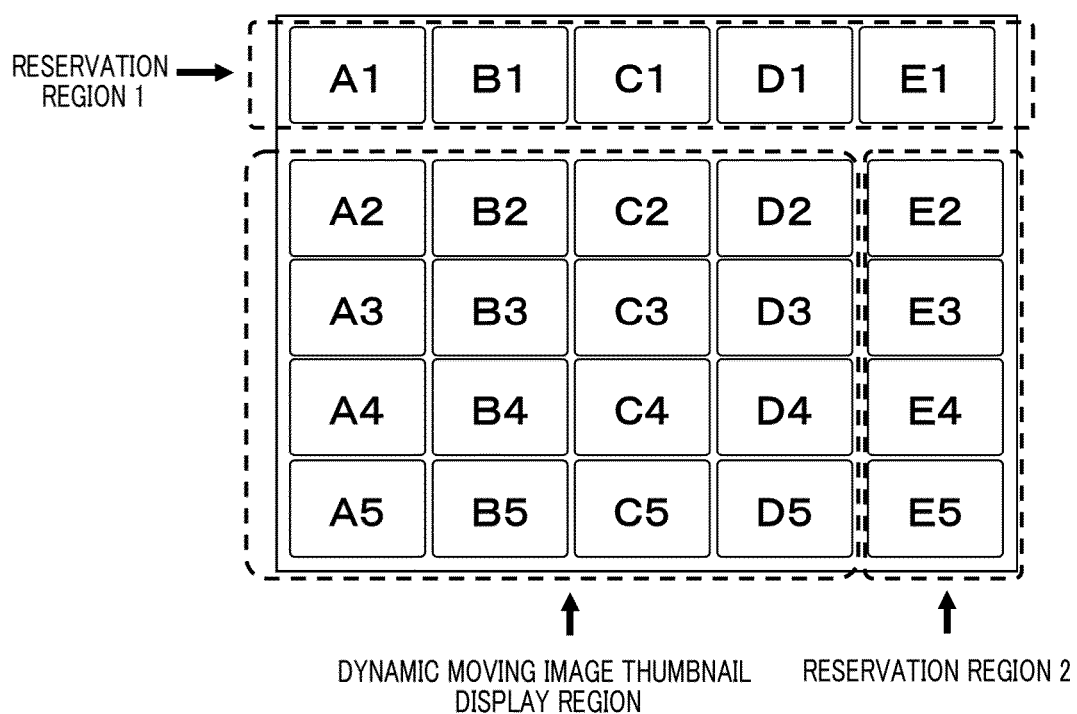
FIG. 7A is an explanatory view for describing an example of the layout of a transmission image viewed from a terminal side in an embodiment of the system according to at least one embodiment of the present invention.

Next, FIG. 7A illustrates an example of the layout of transmission images viewed from a terminal side in an embodiment of the system according to the present invention.

FIG. 7A illustrates a thumbnail group configured as a channel, and a total of 25 moving image thumbnails are arranged in the form of a 5×5 matrix. The number of moving image thumbnails and the layout thereof are flexibly optimized, for example, based on a display screen size and an aspect ratio of a terminal. Further, control is performed such that updating of a moving image thumbnail is not performed in a reservation region 1 including A1, B1, C1, D1, and E1 and a reservation region 2 including E2, E3, E4, and E5. In other words, in a channel illustrated in FIG. 7A, updatable moving image thumbnails are A2, B2, C2, D2, A3, B3, C3, D3, A4, B4, C4, D4, A5, B5, C5, D5, and a maximum intra-channel updatable display number is 16. In FIG. 7A, for example, a moving image channel is swapped in or out in an updatable moving image thumbnail region based on a rule which will be described later. The reservation region is not limited to 1 and 2 mentioned above, and one or more reservation regions may be set in an arbitrary display screen.

Here, for example, a moving image thumbnail related to a moving image displayed on an updatable moving image thumbnail region such as an advertisement is fixedly arranged on the reservation regions 1 and 2. In addition, for example, a popular moving image thumbnail or a representative moving image thumbnail of a channel on which uploading of a moving image is concentrated can be displayed under special privilege.

In all display areas, an uploaded moving image may be a stock content as well as a live video.

Figure 7B:
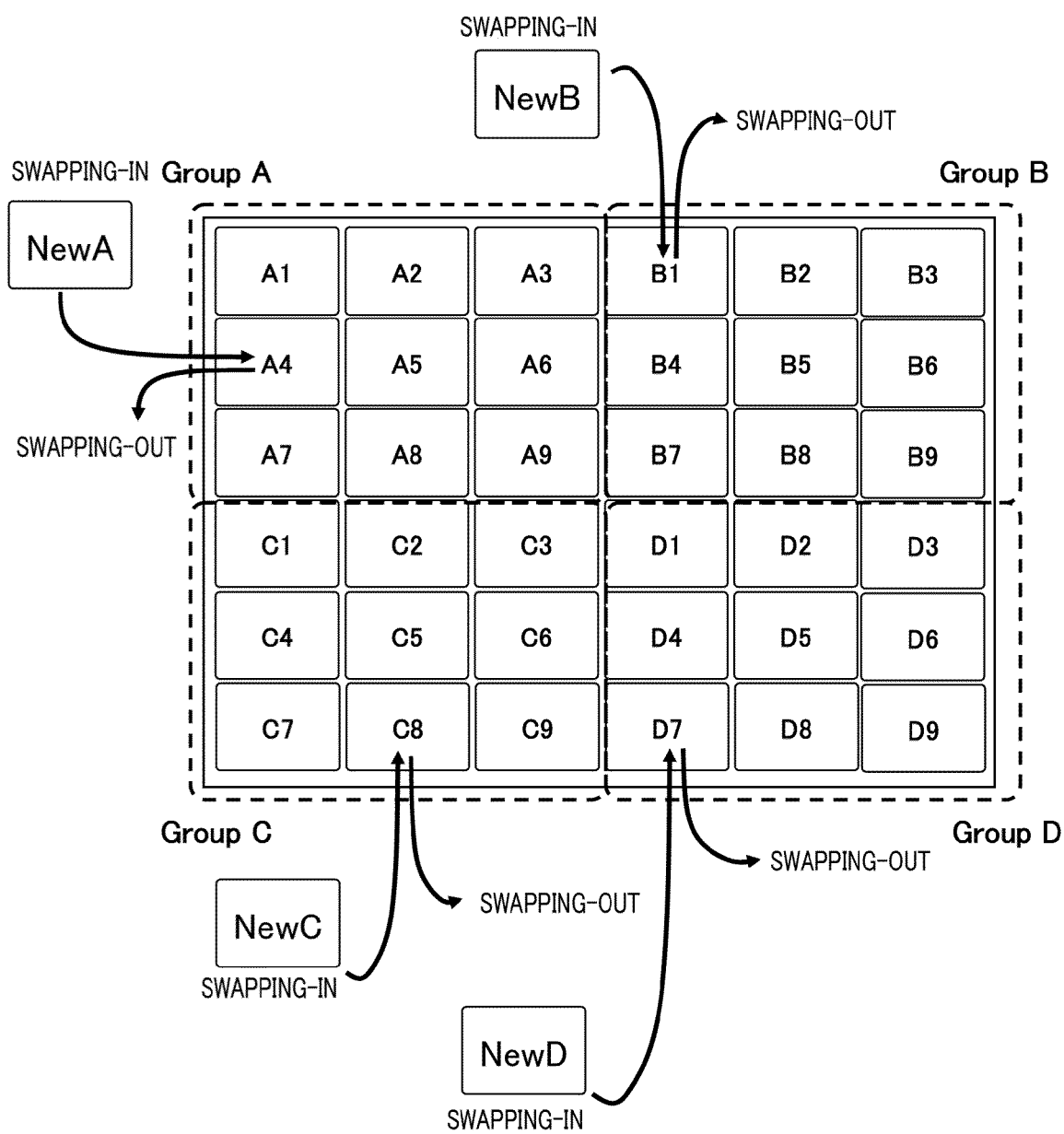
FIG. 7B is an explanatory view for describing another example of the layout of a transmission image viewed from a terminal side in an embodiment of the system according to at least one embodiment of the present invention.

FIG. 7B illustrates another example of the layout of a transmission image viewed from a terminal side in an embodiment of the system according to the present invention.

Referring to FIG. 7B, a total of 36 moving image thumbnails arranged in the form of a 6×6 matrix are configured as a channel, and the moving image thumbnails are divided into four groups, that is, a group A including A1 to A9, a group B including B1 to B9, a group C including C1 to C9, and a group D including D1 to D9. For example, this grouping can be used when communication of a group competition type is performed between members gathered at the same channel. In this case, swapping-in and swapping-out are executed in units of groups as an embodiment.

In addition, as a display process at the time of swapping-in and swapping-out of a moving image thumbnail, when a new moving image thumbnail is swapped in, a viewer's attention can be drawn to a corresponding moving image thumbnail by performing a decoration process such as a process of increasing brightness of all corresponding moving image thumbnails, a process of giving a blinking animation effect by applying a specific color to an edge portion of a corresponding moving image thumbnail, or a process of giving an animation effect by arranging various patterns on a corresponding moving image thumbnail. Similarly, as a process at the time of swapping-out of a moving image thumbnail, a viewer's attention can be drawn to a moving image thumbnail immediately before a display ends by performing a process of decreasing brightness of all corresponding moving image thumbnails stepwise, a process of giving a blinking animation effect by applying a specific color to an edge portion of a corresponding thumbnail, or a process of switching an image on a corresponding thumbnail.

Figure 7C:
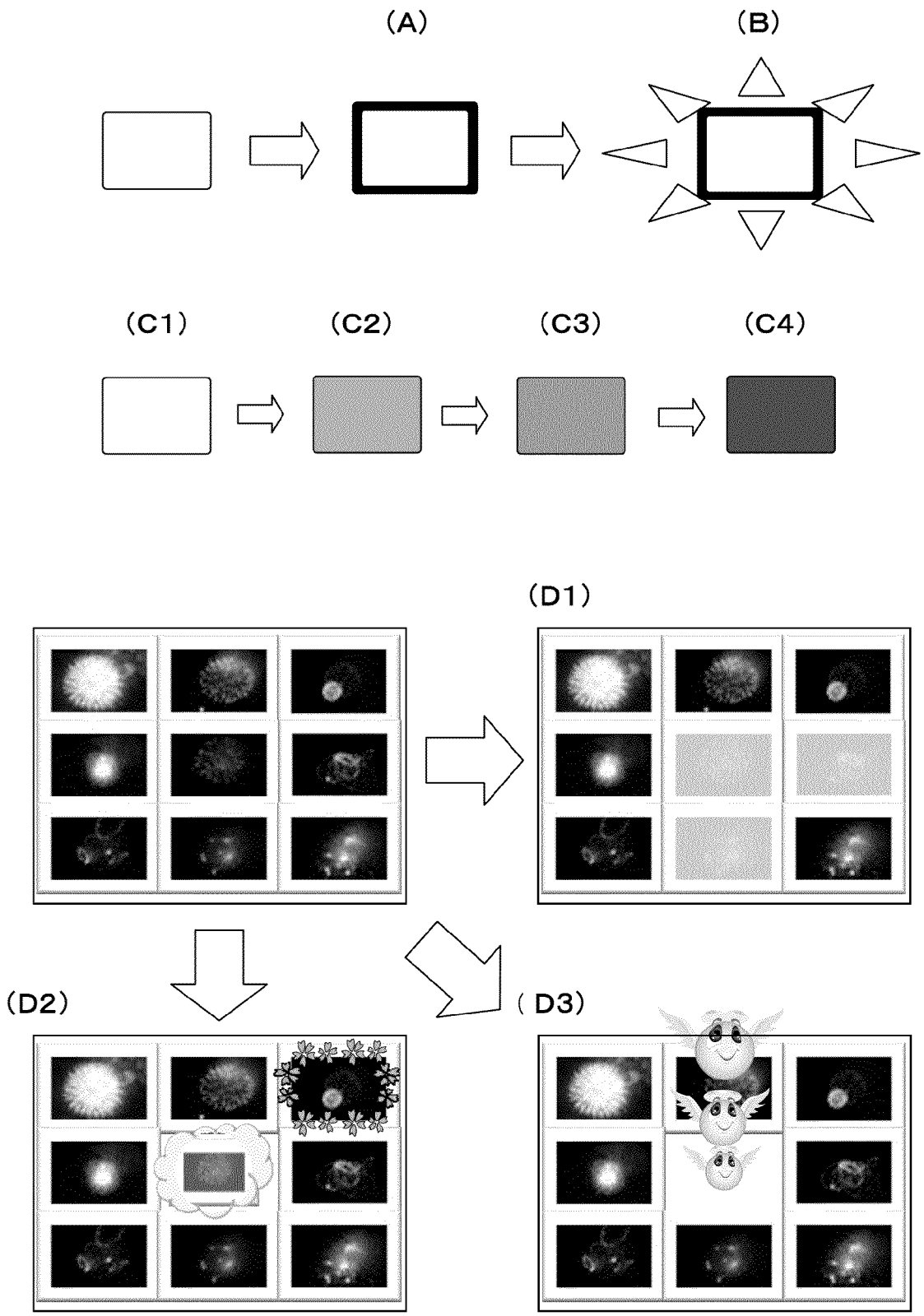
FIG. 7C is an explanatory view for describing an effect process example on a moving image thumbnail viewed from a terminal side in an embodiment of the system according to at least one embodiment of the present invention.

Specifically, as illustrated in FIG. 7C, there can be performed an effect process such as a process (A) of attaching a frame, a process (B) of blinking a frame, a process (C1 to C4) of decreasing brightness of all moving image thumbnails stepwise, a process (D1) of erasing a plurality of moving image thumbnails that satisfy a certain rule, a process (D2) of causing flower petals to appear around a corresponding moving image thumbnail or erasing a corresponding moving image thumbnail by a vanishing effect, or a process (D3) of animating a character.

In addition, although not illustrated, the user can register an arbitrary moving image thumbnail in a channel to a bookmark. For example, a moving image thumbnail registered to a bookmark can be stored in the server system 101. The bookmarked moving image thumbnail group can be called as the use's own thumbnail group preferred by the user.

Figure 8:
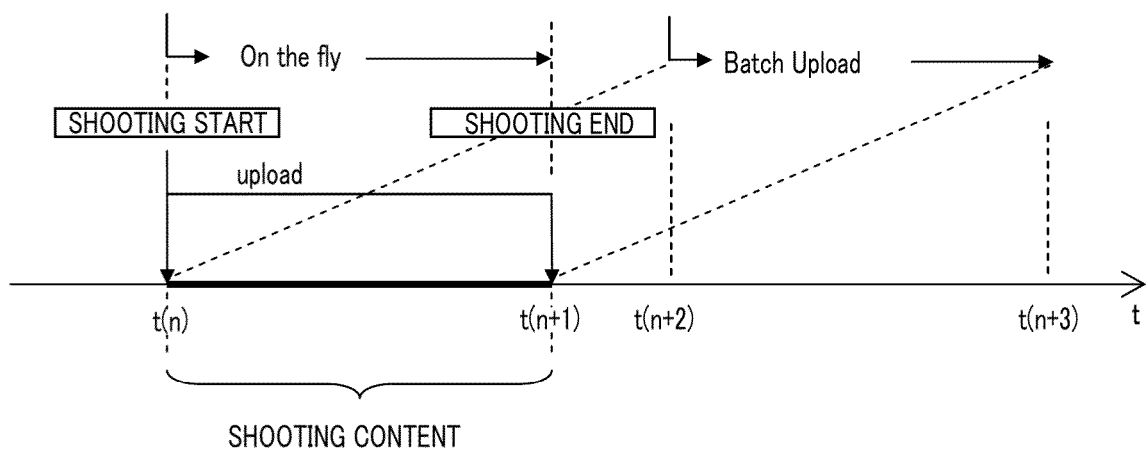
FIG. 8 is an explanatory view for describing a time management concept of a moving image thumbnail in an embodiment of the system according to at least one embodiment of the present invention.

Next, FIG. 8 is a time management conceptual diagram of a moving image thumbnail in an embodiment of the system according to the present invention.

A time axis illustrated in FIG. 8 represents times at which the user monitors in order to shoot a certain object or event using the terminal 105, starts shooting, and uploads a shot video, as an example. For example, the user carries the terminal 105, starts monitoring when meeting an object or an event which is desired to be shot, and then starts shooting. Here, as a relation between a shooting operation and an uploading operation on the time axis, there are cases in which both operations are simultaneously performed ("On the fly" in FIG. 8) or in which an upload operation is performed when a certain time elapses after a shooting operation ends ("Batch Upload" in FIG. 8). These cases will be described below.

[On the Fly]

The user starts shooting at a time t(n), and uploads a shot moving image to the moving image collection/delivery server 101a in real time. Here, an upload time is a time from t(n) to t(n+1), and shooting and uploading end at the time t(n+1).

[Batch Upload]

The user starts shooting at the time t(n), and a shot moving image is not uploaded until the time t(n+1) at which shooting ends. After shooting ends, for example, the moving image is uploaded at the time t(n+2) during a certain time period, and uploading ends at a time t(n+3) at which the moving image ends. The time t(n+2) at which uploading of a moving image starts may be between the time t(n) and the time t(n+1).

In a variation of the above embodiment, the moving image collection/delivery server 101a uses the time t(n) as a "shooting start time" of a moving image, that is, a common absolute reference time. In this case, an "upload time" of a moving image is recorded as supplementary additional data by the server 101a when the server 101a recognizes uploading by the terminal 105.

The shooting time can be used as a calibrated real time clock (RTC) of the terminal 105. Besides, global positioning system (GPS) information representing a shooting place or attribute information related to a photographer (user) may be transmitted as necessary together with a moving image to be uploaded. In this case, time information obtained from the GPS may be used as the RTC.

Figure 9A:
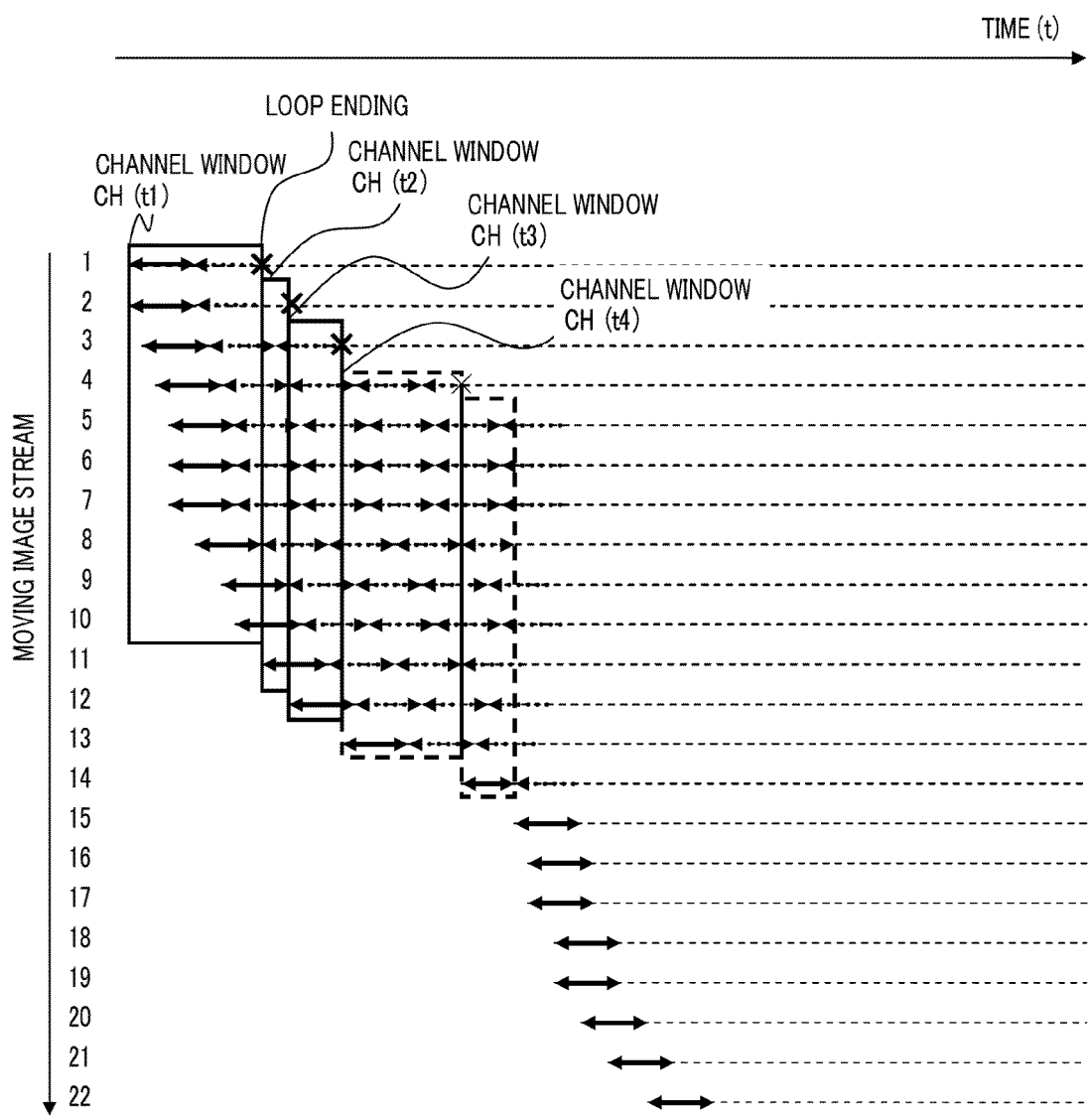
FIG. 9A is an explanatory view for describing a channel update example in an embodiment of the system according to at least one embodiment of the present invention.

Next, FIG. 9A illustrates a channel update example based on a time management concept of a moving image thumbnail of a system according to the present invention.

FIG. 9A illustrates a state in which moving images are sequentially uploaded by On the fly in the server 101a in a vertical axis. FIG. 9A illustrates 1st to 22nd moving image streams which are sequentially uploaded. A section whose both ends are indicated by a solid arrow represents a moving image which is uploaded in real time at the time of shooting, and a section whose both ends are indicated by a dotted arrow represents loop reproduction executed in the server 101a or the terminal 105. A horizontal axis of FIG. 9A is a time axis (t) representing a shooting time of each moving image.

In FIG. 9A, first moving image thumbnail 1 and 2 are input at time t1. The moving image thumbnail 1 and 2 are shot at the same "shooting start time" and uploaded to the server 101a, but in the server 101a, even though the moving image thumbnail 1 and 2 are shot at the same shooting time, a rank is decided within a corresponding time for the sake of management. As far as the channel window CH(t1) is not larger than a maximum intra-channel display number (which is here set to 10 for example), updating of a moving image thumbnail in a channel is not performed, and (1st to 10th) moving image thumbnails are sequentially input to the channel window CH(t1), so that a time axis area such as the channel window CH(t1) is formed. As an embodiment, when a new moving image thumbnail is not input in a channel and a reproduction time of each moving image thumbnail ends, it returns to the first stage, the loop reproduction is performed, and then the same process is continued.

Next, the 11th moving image thumbnail is swapped in at time t2, the moving image thumbnail 1 which is lower in a rank is swapped out, and updating to a new channel window CH(t2) is made. Next, the 12th moving image thumbnail is swapped in a channel window, the moving image thumbnail 2 that is oldest in a shooting start time in the channel window CH(t2) is swapped out, and updating to a channel window CH(t3) including 3rd to 12th moving image thumbnails are made. Next, the same process is performed (the channel window CH(t4) . . . ).

When a moving image is uploaded by On the fly, channel updating is performed in the above-described manner.

Figure 9B:
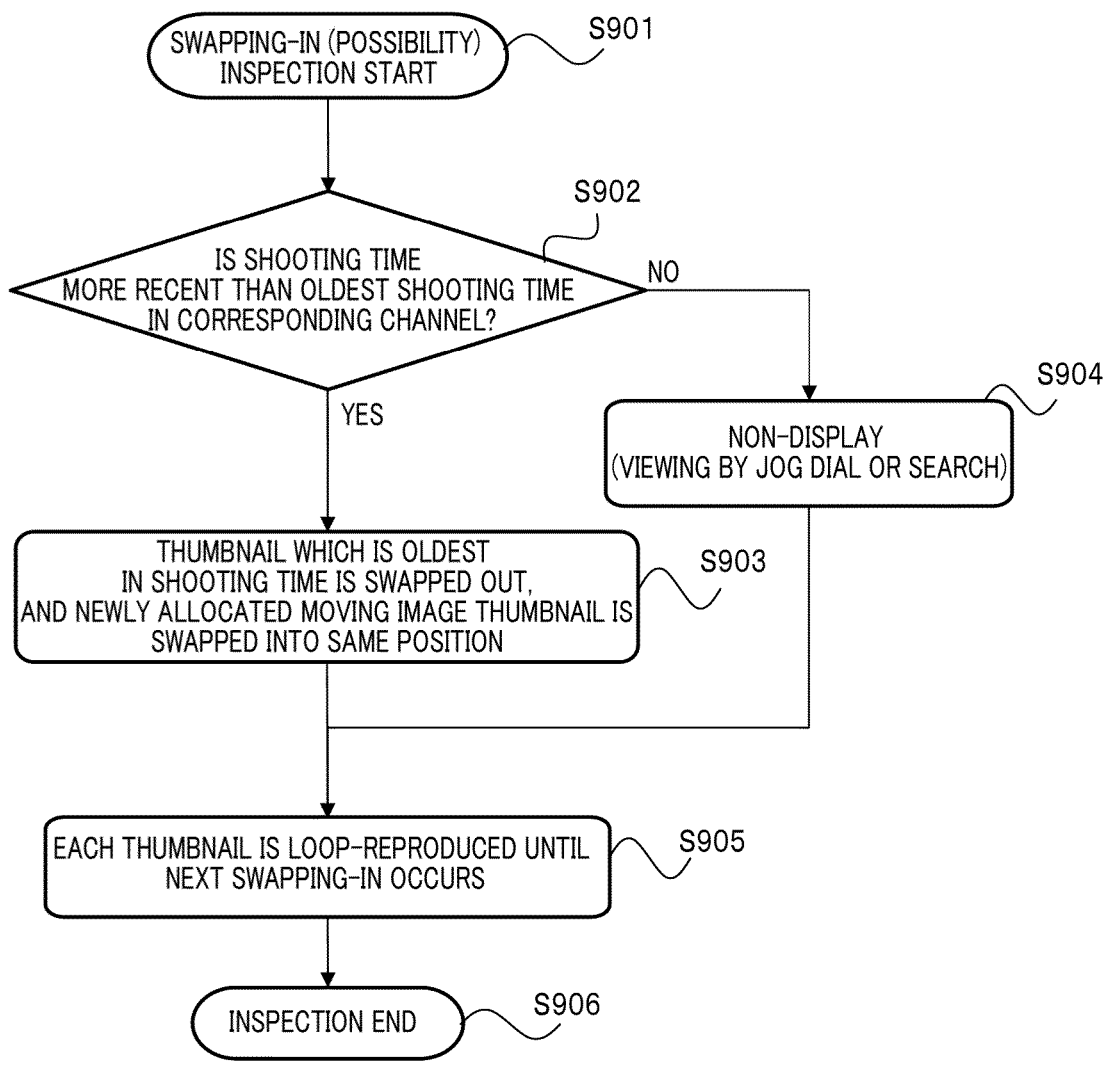
FIG. 9B is an explanatory view for describing a channel update process flow in an embodiment of the system according to at least one embodiment of the present invention.

FIG. 9B is a process of a moving image thumbnail which is sequentially swapped in by On the fly and a channel update process flow. FIG. 9B is under the assumption that the number of moving image thumbnails input to a channel has already reached a maximum intra-channel display number and thus swapping needs to be performed. In this flow, only a display routine of a moving image thumbnail is described, but separately, a moving image uploaded from the terminal 105 is accumulated in the archive 101c.

In S901, a new moving image thumbnail is allocated to a specific channel, an inspection on whether or not swapping-in is possible in this channel starts, and then the process proceeds to S902. In S902, it is determined whether or not a shooting time of the newly allocated moving image thumbnail is more recent than an oldest shooting time in a corresponding channel.

Here, when it is determined that a shooting time of the newly allocated moving image thumbnail is more recent than an oldest shooting time in a corresponding channel (Yes in S902), the process proceeds to S903. In S903, a thumbnail which is oldest in shooting time in a channel is swapped out, and the newly allocated moving image thumbnail is swapped in to the same position.

However, when it is determined that a shooting time of the newly allocated moving image thumbnail is older than an oldest shooting time in a corresponding channel (No in S902), the moving image thumbnail is not displayed on the corresponding channel (S904). The moving image thumbnail that is treated not to be displayed is accumulated in the moving image archive 101c, and can be viewed through the terminal 105 as a past channel traced back along a time axis by an operation by a jog dial.

Then, until next swapping-in occurs, each thumbnail is loop-reproduced in a corresponding channel (S905), and an inspection process ends (S906).

Figure 10:
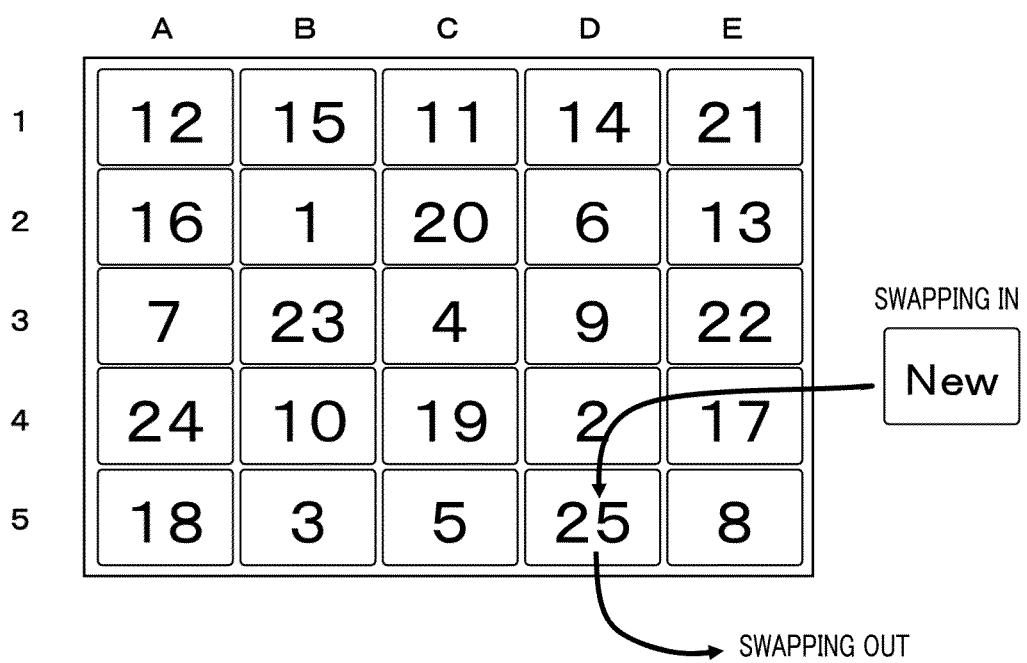
FIG. 10 is an explanatory view for describing a concrete example of updating a channel generated by a moving image collection/delivery server in an embodiment of the system according to at least one embodiment of the present invention.

Next, FIG. 10 illustrates a concrete example of updating of a channel generated in the moving image collection/delivery server in an embodiment of the system according to the present invention.

FIG. 10 illustrates a thumbnail group configured as a channel, and a total of 25 moving image thumbnails are arranged in the form of a 5×5 matrix (row numbers of 1 to 5 are given, and column numbers of 1 to 5 are given). In this case, the maximum intra-channel display number is 25. Here, a priority order is given to each moving image thumbnail based on a rule. In FIG. 10, the smaller a number is, the higher a priority order is. Here, when each moving image thumbnail is represented by (a row number, a column number), a priority order of a moving image thumbnail A1 is 12, a priority order of a moving image thumbnail B1 is 15, and a priority order of a moving image thumbnail C1 is 11. A priority order of a moving image thumbnail E5 is 8. Here, moving image thumbnails listed in descending priority order are B2, D4, B5, C3, C5, D2, A3, E5, D3, B4, C1, A1, E2, D1, B1, A2, E4, A5, C4, C2, E1, E3, B3, A4, and D5.

Here, when a new image thumbnail (New) to be allocated to the channel illustrated in FIG. 10 is input, D5 which is lowest in priority order is swapped out, and the moving image thumbnail New is swapped into this position.

A shooting time at which a moving image is shot in the terminal 105 may be used as a priority order. For example, when a priority order is given starting from a moving image which is new in a shooting time, in FIG. 10, a moving image thumbnail D5 is a moving image thumbnail which is oldest in a shooting time, and when the moving image thumbnail New is swapped in, the moving image thumbnail D5 is replaced with the moving image thumbnail New while maintaining the display position of D5.

Besides a shooting time of a moving image, a reference frequency (attention degree) may be used as a priority order. When an attention degree is used, in FIG. 10, the moving image thumbnail D5 is a moving image thumbnail which is lowest in attention degree (lowest in reference frequency), and when the moving image thumbnail New is swapped in, the moving image thumbnail D5 is replaced with the moving image thumbnail New while maintaining the display position of D5.

Alternatively, a priority order may be decided by a combination of a shooting time of a moving image and a reference frequency (attention degree) after uploading, and a priority order representing a feature of a channel may be given for each channel.

Figure 11A:
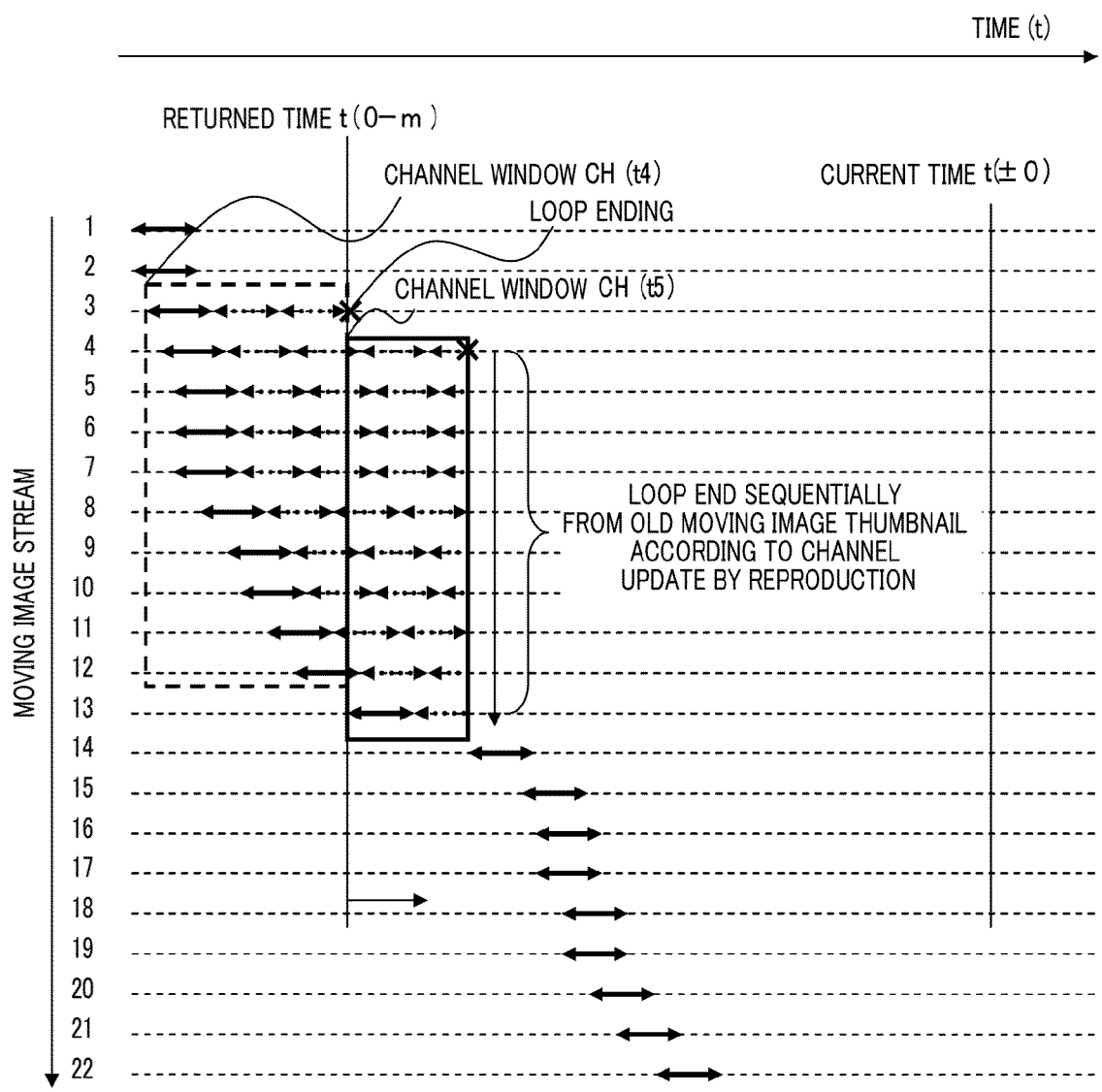
FIG. 11A is an explanatory view for describing an update example of a moving image thumbnail group in a channel in an embodiment of the system according to at least one embodiment of the present invention.

Next, FIG. 11A illustrates an update example of an intra-channel moving image thumbnail group based on a time axis operation in a system according to the present invention.

In FIG. 11A, a time is turned back from a current time t(±0) to a past time t(0−m) using a device such as a jog dial. At a point in time at which a time is rewound up to the past time t(0−m), a time axis is sequentially traced back from the 13th moving image thumbnail whose shooting time is time t(0−m), an original moving image corresponding to a moving image thumbnail corresponding to a maximum intra-channel display number (which is here 10 for example) are instantaneously read from the moving image archive 101c, and a state channel window CH(t5) at time t(0−m) of each moving image thumbnail is recreated. In this case, when a pause state is made at the time t(0−m), pause images corresponding to moving image thumbnail 4 to 13 in all channels are displayed on the display of the terminal 105 or the like at the time t(0−m) of the channel window CH(t5).

Next, when normal reproduction is performed from the time t(0−m), the moving image thumbnails 4 to 13 in the channel window CH(t5) are simultaneously reproduced, and the moving image thumbnails in the channel window CH(t5) are repeatedly reproduced until a next new moving image thumbnail is swapped in.

Next, when reverse reproduction is performed from the time t(0−m), the moving image thumbnail 13 is swapped out, the moving image thumbnail 3 is swapped in at the time t(0−m), the channel window is updated to the channel window CH(t4), and then reproduction tracing back along the time axis is performed.

In a series of time-axis operations described above, a similar channel window operation is executed even in a time-axis operation such as fast forward reproduction (Fast Forward), fast reverse reproduction (ReWind), and frame-by-frame reproduction.

Figure 11B:
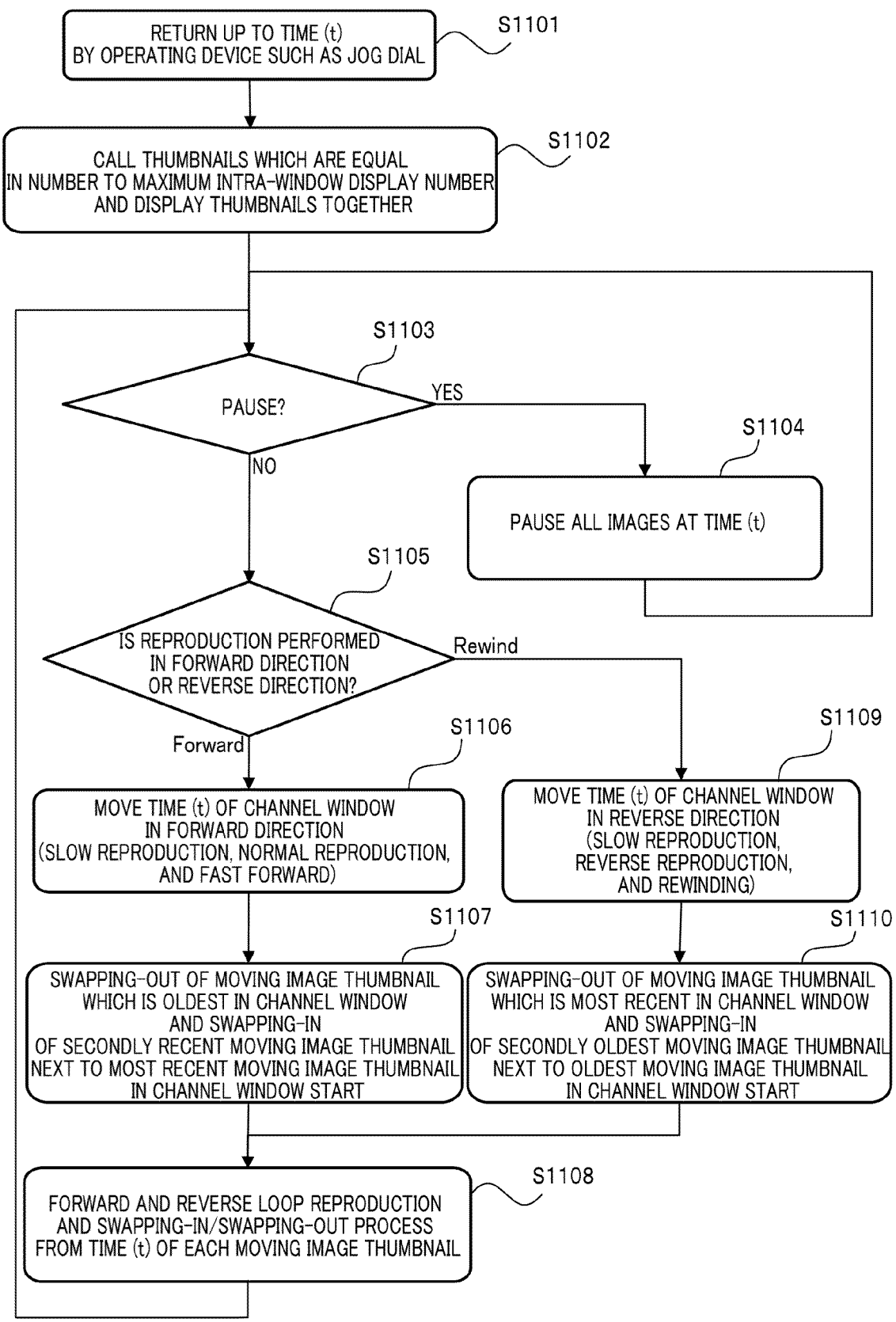
FIG. 11B is an explanatory view for describing an update process flow of a moving image thumbnail group in a channel in an embodiment of the system according to at least one embodiment of the present invention.

FIG. 11B illustrates the flow of the above process.

Figure 11C:
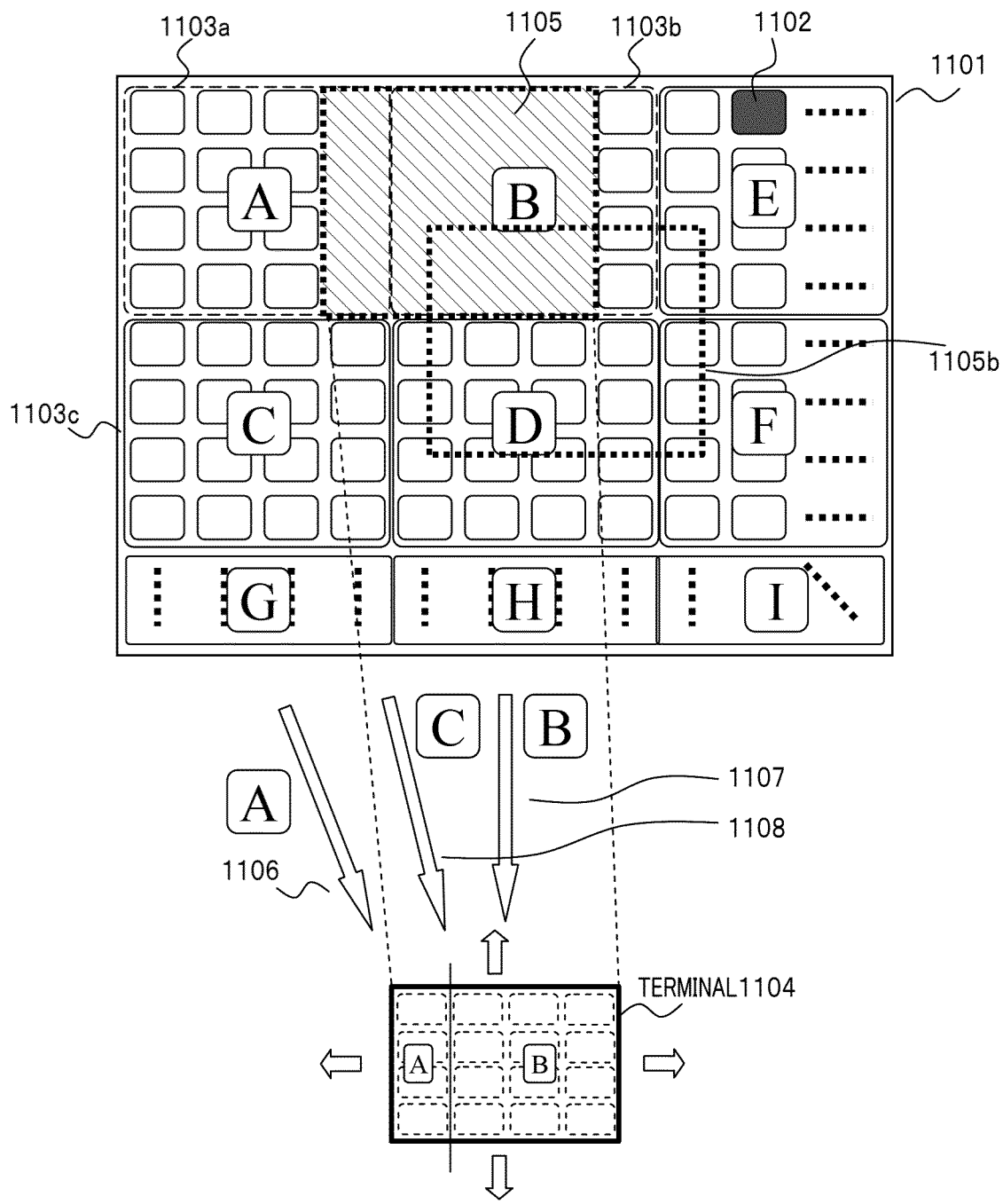
FIG. 11C is an explanatory view for describing a concept of a process of scrolling within a channel performed at a terminal in an embodiment of the system according to at least one embodiment of the present invention.

FIG. 11C illustrates an example of a process of dividing a channel including a number of moving image thumbnails and transmitting a divided channel to a terminal with a limited display screen size.

In FIG. 11C, the moving image collection/delivery the server 101a divides a single channel 1101 into a plurality of transmission units A to I according to a screen size of a terminal with a limited display screen size and transmits each transmission unit. The terminal side can simultaneously receive one or more neighboring transmission units including the transmission unit, and the plurality of transmission unit can be smoothly scrolled by an operation at the terminal side.

As an example of a process, for example, when the terminal side scrolls a region of a transmission unit B (1103b) in a left direction, a smooth scroll can be implemented by simultaneously receiving a stream A (1106) of a transmission unit A (1103a) which is at the left side of the current transmission unit B, generating a display screen (for example, a portion of 1105) corresponding to a scroll operation, and displaying the display screen on the terminal 1104.

Similarly, for example, when the terminal side scrolls a region of the transmission unit B (1103b) in a lower right direction, an omnidirectional smooth scroll can be implemented by simultaneously receiving a total of 4 streams together with transmission units E, D, and F which are at the right side of and below the current transmission unit B, generating a display screen (for example, a portion of 1105b), and displaying the display screen on the terminal 1104.

Figure 12:
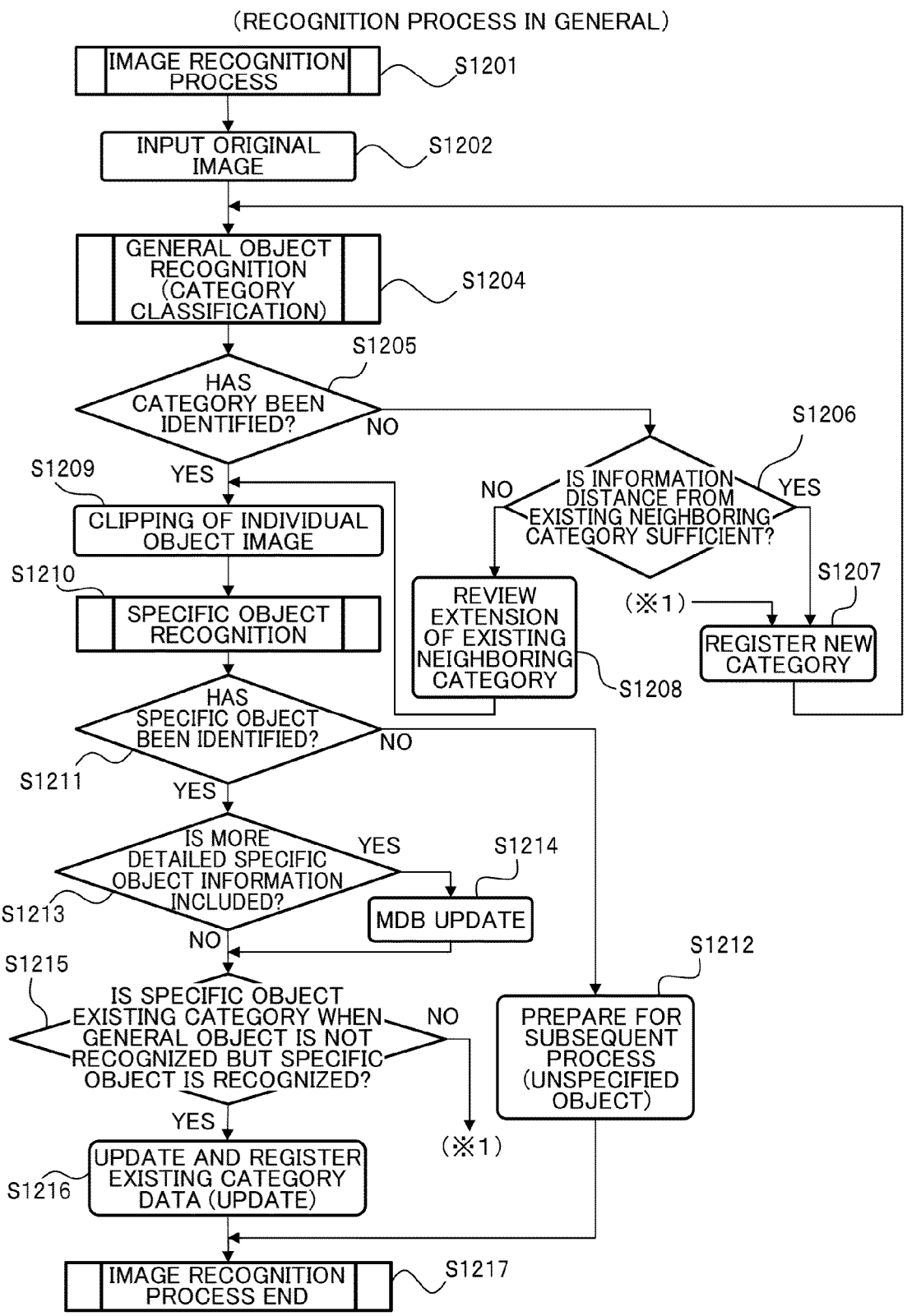
FIG. 12 is an explanatory view for describing an image recognition flow in an embodiment of the system according to at least one embodiment of the present invention.

FIG. 12 illustrates an overall image recognition process flow performed by the real-time image recognition system 102 and the MDB 103 in a system according to the present invention.

[General Object Recognition]

First, an image recognition process (S1201) starts when the terminal 105 receives an original image (S1202). The original image may be either a two-dimensional (2D) image or a three-dimensional image (3D), and may be either a still image or a moving image. In addition, the original image may be input such that an attention region of a certain object in the original image is indicated by a device (not illustrated) such as a pointing device or such that the entire original image is input as a processing target without an indication of an attention point. Next, in S1204, the general object recognition process is performed. For example, a bag-of-features (BOF) technique may be employed as the general object recognition process. In the general object recognition process, up to recognition of a category (a general name of an object) of a detected object is performed. Here, when an attention point is indicated, the process is bifurcated according to whether or not category has been recognized, and the determination is performed in S1205. When a category has not been recognized, the process proceeds to S1206, a determination on handling of an existing category is made (S1207). However, when it is possible to recognize a category of an object regardless the presence or absence of an indication on an attention point, the process proceeds to S1209 in order to perform the specific object recognition process.

[Specific Object Recognition]

When the process proceeds to the specific object recognition process based on the determination of S1205, in step S1209, first a clipping process of an individual object image is performed. Then, the specific object recognition process is performed on the clipped individual object image (S1210). In the specific object recognition process, identification of an object is tested by an evaluation function that calculates a coincidence degree based on the feature quantity data 103-03 extracted from the design data 103-01 registered to the MDB 103.

[Learning Process (1)]

Meanwhile, when it is determined in S1205 that a general object has not been recognized, the process proceeds to S1206. In S1206, it is determined whether a new category including an attention object is to be registered (S1207) or extension of an existing category adjacent to the attention object is to be reviewed (S1208) based on an information distance between a feature quantity of the attention object and a feature quantity of an object belonging to an existing category grasped by the MDB 103. When a new category is registered (S1207), the process returns to S1204, whereas when an existing category is extended (S1208), the process proceeds to S1209.

[Learning Process (2) After Specific Object Recognition]

In S1211, it is determined whether or not a specific object has been identified. When it is determined that a specific object has been identified, the process proceeds to S1213. In S1213, it is determined whether or not information more precise than detailed data of an object registered to the MDB 103 is included in the individual object image clipped in S1209. When a positive (YES) determination is made in S1213, the process proceeds to S1214. In S1214, detailed data of an object is updated in the MDB 103 by the MDB learning unit 102-07 to have more precise information. However, when a negative (NO) determination is made in S1213, the process proceeds to S1215, and the following determination is performed.

A determination of S1215 is performed when it is determined in S1205 that a general object has not been recognized, then the process to proceeds to S1208, S1209, and S1210 through the determination of S1206, and then it is determined that a specific object has been identified (Yes in S1211). Then, when it is determined in S1215 that a specific object is in an existing category, the category data 103-04 is updated (S1216) such that division is performed when a definition of an existing category registered to the MDB 103 is extended or information distance of an object in a category is dispersed by extension (FIG. 19(A)), integration is performed when information distance from a neighboring category is equal to or less than information distance between objects in the category (FIG. 19(B)), revision is executed when the variance of information of an existing object is found by registration of a specified object (FIG. 19(C)). However, when it is determined in S1215 that a specific object is not in an existing category, the process returns to S1207, and a new category is registered.

Meanwhile, when it is determined in S1211 that a specific object has not been recognized, the object is registered to the MDB 103 as an "unidentified object," and the recognition process ends for a subsequent process (S1217). Even when an existing category is extended and updated in S1216, the recognition process ends (S1217).

Figure 13:
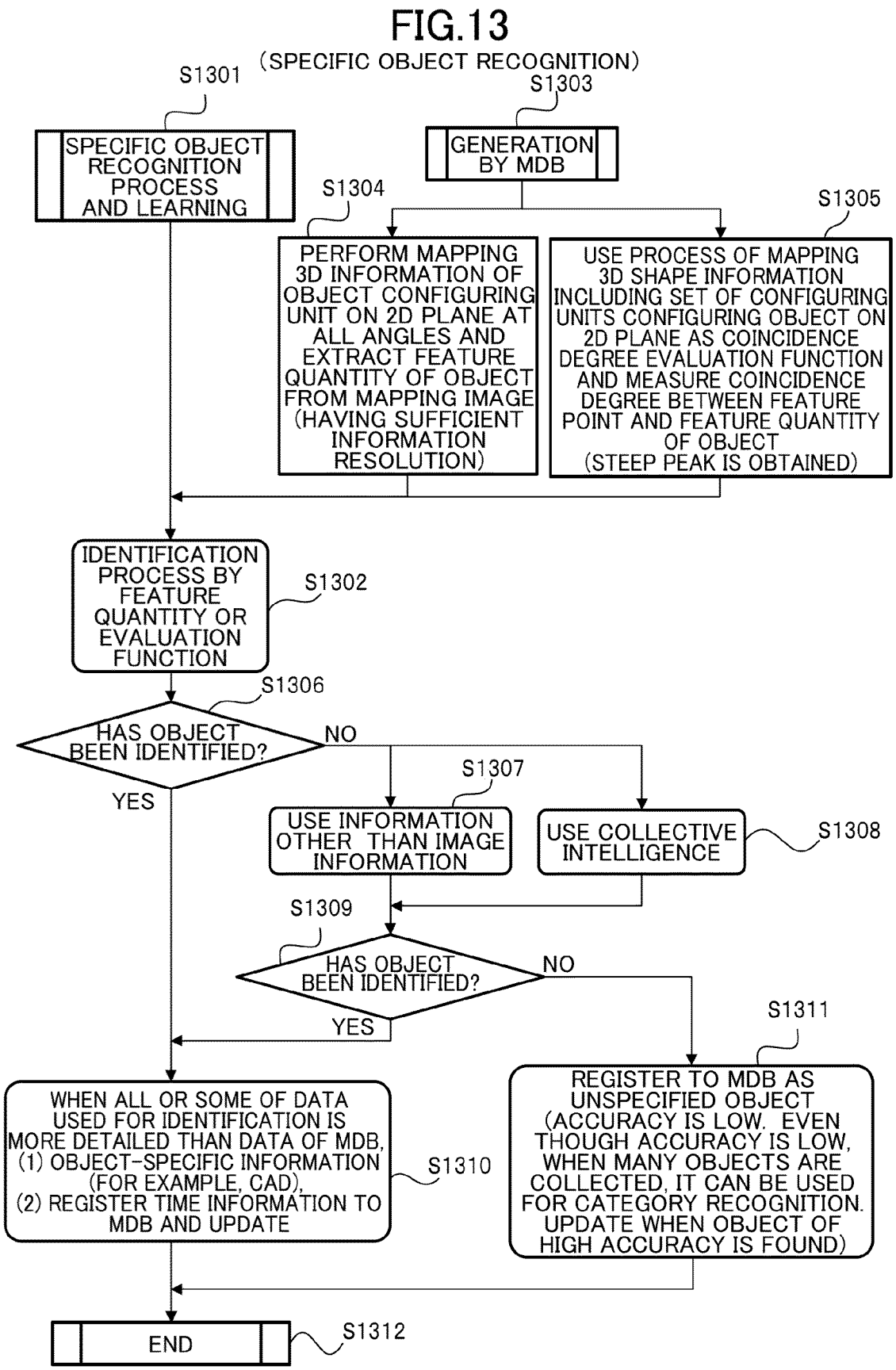
FIG. 13 is an explanatory view for describing an image recognition flow in an embodiment of the system according to at least one embodiment of the present invention.

FIG. 13 is a flowchart illustrating another embodiment on parts of the specific object recognition process and the learning process in FIG. 12. The description will be made below in detail.

First, in S1301, the specific object recognition process starts. Here, design data of the same layer as well as an image of a single object can be used as input data. In addition, design data linked with an image or design data itself (which may be related to not only an entire product but also a part) can be used.

Next, in S1302, a feature point and a feature quantity in an original image are extracted based on the feature quantity data 103-03 generated by the MDB, and are compared with feature quantity data generated by the MDB. Here, there are two methods of generating feature quantity data through the MDB and comparing the feature quantity data.

In a first method, mapping is performed on a 2D plane at all angles based on 3D information of each minimum unit (which is represented by design data or the like) configuring an object, and a feature quantity used to specify an object is generated from the mapping image. At the time of comparison, a feature quantity is extracted from an input image based on the feature quantity, and an appearance portion or frequency or the like is compared (S1304). Here, for example, the feature quantity is generated based on a contour extraction technique, a SURF technique, or the like.

A second method is a method (a tune method) in which a process of mapping 3D shape information including a set of minimum units (for example, design data) configuring an object on a 2D plane while changing a projection angle or a magnification power is used as an evaluation function, and a difference between a feature point of an object and a feature quantity is determined as a coincidence degree (S1305).

In the conventional art, many images used as a sample are collected, and then an identification process (S1302) by a feature quantity or an evaluation function is performed, and thus the method (S1303) of generating by the MDB described in S1304 or S1305 is more advantages that the conventional art in that a degree of identification accuracy increases.

Next, in S1306, it is determined whether or not an object has been identified. When an object has been identified, the process proceeds to S1310. In S1310, it is determined whether data used for identification is more detailed than data of the MDB or is up to date. Based on this determination, object-specific information (for example, design data) or time information (a type of an object or version information) is updated and registered to the MDB, and the specific object recognition process ends. In other words, information registration and MDB updating serve as a database learning process.

Meanwhile, when it is determined in S1306 that an object has not been identified, information (a text or a logo in an image) other than image information is extracted, and an object identification process is performed. For example, when a logo of a very popular brand is shown on an object in an image, there are cases in which identification can be easily performed even though most of an object is out of a frame. Thus, the process proceeds to S1309, and it is determined whether or not an object has been identified again. When an object has been identified (Yes in S1309), the process proceeds to S1310. In S1310, it is determined whether data used for identification is more detailed than data of the MDB or is up to data. Based on this determination, object-specific information (for example, design data) or time information (a type of an object or version information) is updated and registered to the MDB, and the specific object recognition process ends.

However, when an object has not been identified (No in S1309), a corresponding object is registered to the MDB as an unspecific object, and for preparation for a subsequent update or new category generation (S1311), the specific object recognition process ends (S1312).

Together with or instead of the identification process by information other than image information described in S1307, collective intelligence can be usefully used for identification of an object (S1308). For example, the process of S1308 is performed by searching an encyclopedia on a network or automatically posting to a Q&A bulletin board. In order to have a system to search for an encyclopedia on a network by itself, a search query is generated using a feature quantity generated by the MDB together with a category obtained by general object recognition, and a search is executed. Then, a new feature quantity is extracted from reply content, and it is determined again whether or not it is possible to identify an object. In addition, when automatically posting to a Q&A bulletin board, an original image is uploaded to the bulletin board together with the category obtained by general object recognition. At this time, a previously prepared fixed phrase is automatically edited, and a query such as "please let me know a type of OO" or "please let me know a web site in which design information of ΔΔΔ is open to the public" is posted. Thus, advice such as "it is xx-xxxx" or "design data of ΔΔΔ is obtainable from http://www.aaabbb.com/cad/data.dxf" is given from another user (including a person). The system analyzes and evaluates the advice, access to a designated URL, and makes an attempt to download design data of an object or the like. When identification of an object is successfully performed based on the newly obtained design data, obtained new data is added to the MDB, and the database is updated.

FIG. 14 and FIG. 15 are process concept diagrams for describing an example of the process of S1206, S1207, and S1208 of FIG. 12 in detail. In FIG. 14(A), existing categories A and B which have been already registered to the MDB 103 are present, and a category into which an object Obj1 determined in S1205 as being not recognized as a general object is classified is determined. Here, information distances between a feature quantity of the object Obj1 and feature quantities of the categories A and B are calculated (L1, L2). Then, since it is determined that L1 and L2 are sufficiently far from each other, the object Obj1 belongs to a new category, and thus a new category C is generated and registered (FIG. 14(B)).

Meanwhile, in FIG. 15(A), existing categories A and B which have been already registered to the MDB 103 and an object Obj2 determined in S1205 as being not recognized as a general object are present, and the object Obj2 is close to the category A in terms of each feature quantity. In this case, an information distance between the category A and the object Obj2 is sufficiently short (however, an information distance between the category B and the object Obj2 is sufficiently long). In this case, when a new category C is generated on the object Obj2, since another object may be included in both the category A and the category C. Thus, it is undesirable to generate a new category C. Therefore, when the relation of FIG. 15(A) is established, a definition of the category A is extended to a minimum level, and updating is performed such that the object Obj2 is included in the category A (FIG. 15(B)).

Further, various algorithms (Hamming, Fisher, and the like) based on a coding theory or a distance calculation algorithm based on another information theory can be employed as an information distance calculation algorithm.

Further, various formats can be used as a format of design data registered to the MDB 103 as detailed data of an object. For example, a ".DXF" format, a ".DWG" format, and a ".3DS" format may be used. Further, a method of calculating a feature quantity from the design data, comparing the feature quantity with a feature quantity calculated from an original image in the same dimension, and performing recognition has been already described above.

Figure 16:
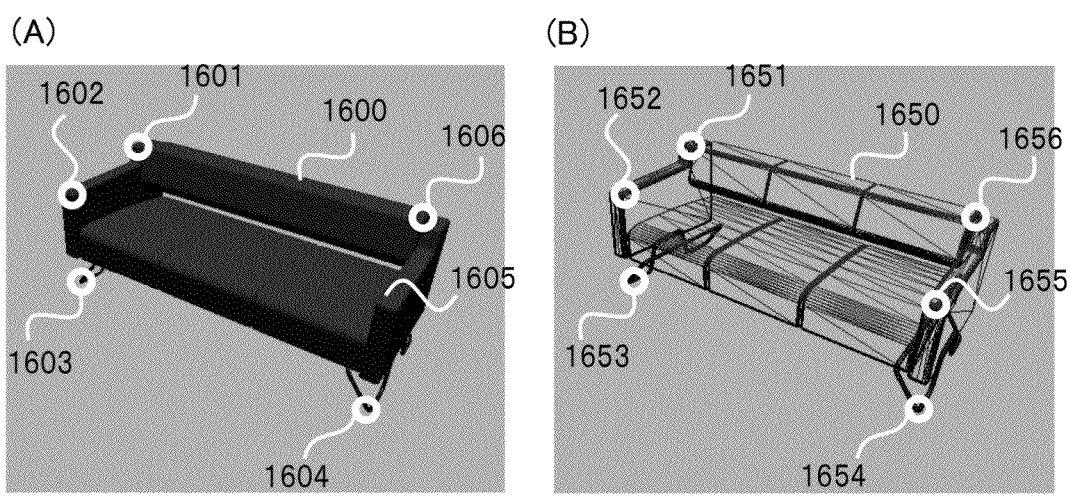
FIG. 16 is an explanatory view for describing a specific object recognition process in an embodiment of the system according to at least one embodiment of the present invention.
Figure 17:
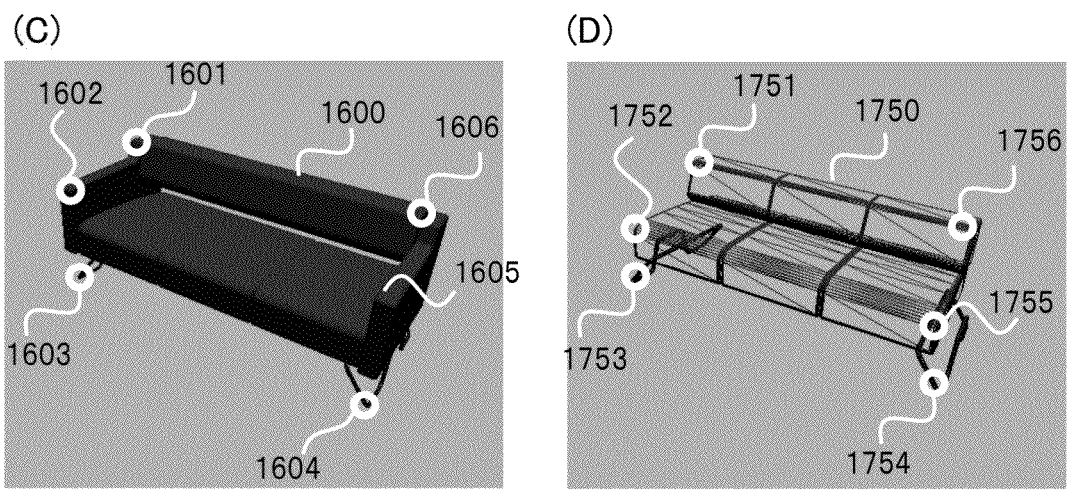
FIG. 17 is an explanatory view for describing a specific object recognition process in an embodiment of the system according to at least one embodiment of the present invention.

Next, an example of a process of performing specific object recognition by comparing a feature quantity of a couch in an original image with a feature quantity of CAD data of a couch registered to the MDB in an image recognition system according to the present invention will be described with reference to FIG. 16 and FIG. 17. FIG. 16 illustrates a case in which a result of object recognition (comparison) represents a match, and FIG. 17 illustrates a case in which a result of object recognition (comparison) represents a mismatch.

[Matched Case]

In FIG. 16(A), 1600 represents an original image of a couch. Here, five feature points are extracted. 1601 is a feature point of a left corner of a backrest when facing forward in the drawing. 1602 is a feature point of a corner of a left armrest of a front in the drawing. 1603 is a feature point of a left front leg portion, and 1604 is a feature point of a right front leg portion. 1606 is a feature point of a left corner of a backrest when facing forward. 1605 is a portion which was not extracted as a feature point, but a number is given for description (a circle is not given).

In FIG. 16(B), 1650 is an image drawn from comparative CAD data of a couch. Here, six feature points are extracted. 1651 is a feature point of a left corner of a backrest when facing forward. 1652 is a feature point of a corner of a left armrest of a front. 1653 is a feature point of a left front leg portion. 1654 is a feature point of a right front leg portion.

1655 is a feature point of a right armrest of a front. 1656 is a feature point of a right corner of a backrest when facing forward.

A comparison is performed between the feature points 1601 and 1651, the feature points 1602 and 1652, the feature points 1603 and 1653, the feature points 1604 and 1654, the feature points 1605 and 1655, and the feature points 1606 and 1656 using a technique (FIG. 18) which will be described later. The feature point 1605 is difficult to be detected, but since a match is made at the other five points, the couch 1600 can be specified as the couch 1650. In other words, when a match is made at all feature points or feature points of a certain ratio or more among the feature points, it can be determined that an object can be specified.

Alternatively, even when a part of an object is hidden (when it is difficult to perform function detection), when a match is made at the other feature points, it can be determined that identification is possible.

[Mismatched Case]

FIG. 17(C) illustrates the same couch as the couch 1600 illustrated in FIG. 16(A).

In FIG. 17(D), 1750 is an image drawn from comparative CAD data of another couch. Here, six feature points are extracted. 1751 is a feature point of a left corner of a backrest when facing forward. 1752 is a feature point of a corner of a left armrest of a front. 1753 is a feature point of a left front leg portion. 1754 is a feature point of a right front leg portion. 1755 is a feature point of a right armrest of a front. 1756 is a feature point of a right corner of a backrest when facing forward.

A comparison is performed between the feature points 1601 and 1751, the feature point 1602 and 1752, the feature points 1603 and 1753, the feature points 1604 and 1754, the feature points 1605 and 1755, and the feature points 1606 and 1756. The feature points 1602 and 1752 do not match each other according to a technique (FIG. 18) which will be described later, and thus 1600 and 1750 are determined as different objects.

[Example of Comparison Determination Technique]

In FIG. 18(K), a horizontal axis represents a phase (including an angle, a distance, a color, and the like), and a vertical axis represents a coincidence degree between an original image and a comparative CAD image. By deviating the comparative CAD image and comparing the feature points, a coincidence degree with the original image has a value between 0 and 1. A value of 0 is given when matched, but a value of 1 is given when mismatched. Depending on a CAD image, a perfect match with an original CAD image is made at one phase of the comparative CAD image of the comparative CAD image. However, since the original image includes noise, it is difficult to make a perfect match. Thus, a line 1802 is obtained according to a phase of the comparative CAD image. In addition, when perfectly mismatched, a line 1803 is obtained.

FIG. 18(L) represents a matched case of FIG. 16 and a mismatched case of FIG. 17. In FIG. 18(L)A, a feature point 1 corresponds to 1603, a feature point 2 corresponds to 1601, a feature point 3 corresponds to 1602, a feature point 4 corresponds to 1606, a feature point 5 corresponds to 1605, and a feature point 6 corresponds to 1604. In FIG. 18(L)A, feature points other than the feature point 1605 which is not extracted at a certain same phase value have a minimum value. Thus, the original image is determined as matching with the comparative CAD image. However, in FIG. 18(L)B, as a result of performing a similar comparison, the feature point 3 corresponding to 1602 has a coincidence degree of a minimum value at a phase value of the comparative CAD image different from other feature points. As a result, the original image is determined as mismatching with the comparative CAD image.

Figure 20:
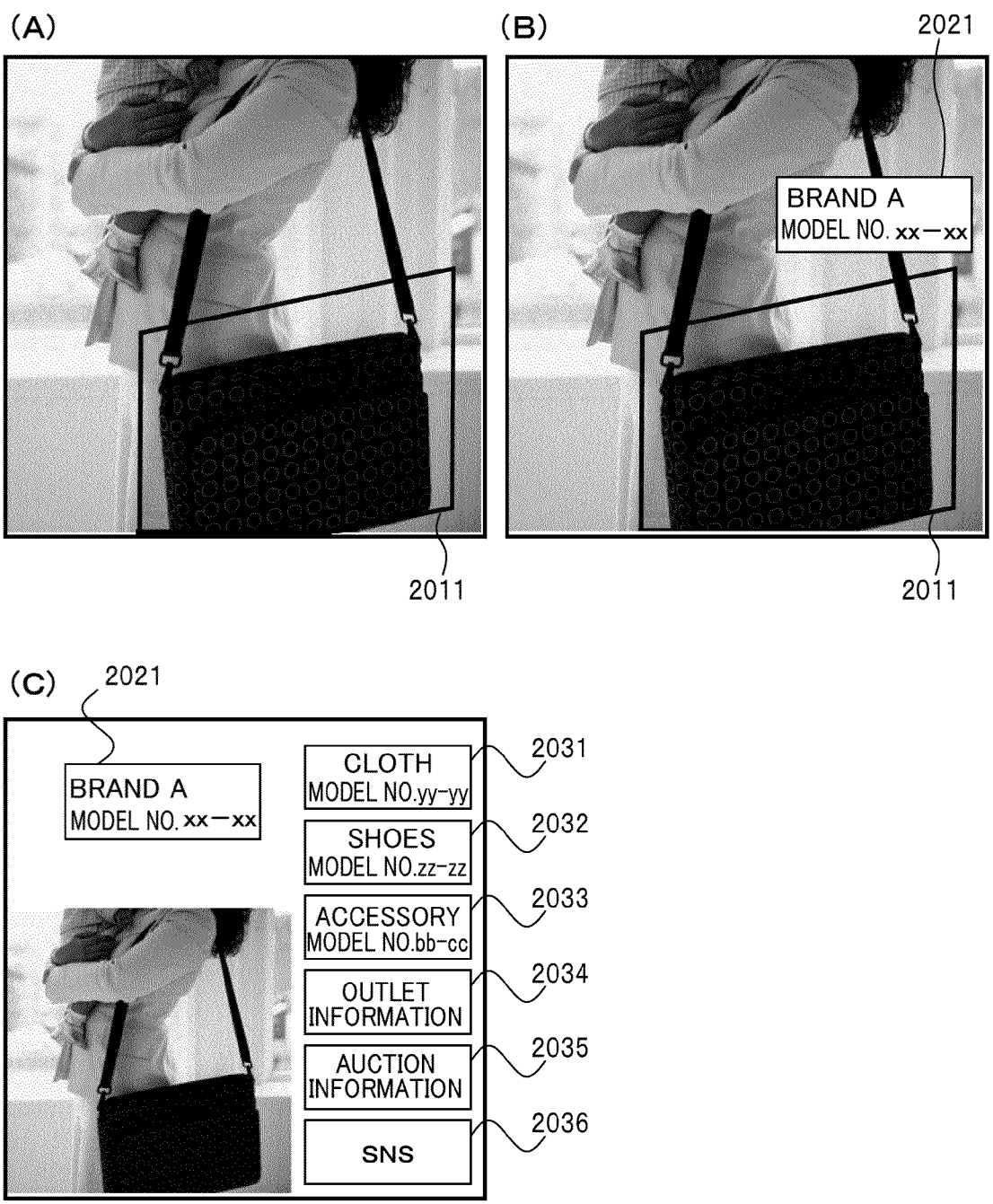
FIG. 20 is an explanatory view for describing a concrete example in which an information group to increase a user's convenience and interest is presented to an individual user in an embodiment of the system according to at least one embodiment of the present invention.

FIG. 20 illustrates a concrete example of presenting an individual user with an information group to increase the user's convenience and interest in an embodiment of a system according to the present invention.

An embodiment illustrated in FIG. 20 is implemented by a cooperation operation of the real-time image recognition system 102, the MDB 103, and the metadata information collection processing system 412 in the system according to the present invention. Particularly, the metadata information collection processing system 412 further includes an attention point/action history DB and a recommendation/advertisement DB (both of which are not illustrated). The metadata information collection processing system 412 accumulates the user's attribute and action history extracted from an attention object or the like in a moving image uploaded in real time by an individual user and presents the user with a recommendation, an advertisement, or the like based on the user's extracted attribute and action history.

In other words, the metadata information collection processing system 412 collects the user's attribute and action history extracted from a moving image selected by an individual user on the terminal 105, a target object in the moving image, a selection order, a moving image uploaded by an individual user, and an attention object in the moving image according to an instruction of the moving image collection/delivery the server 101a. The collected data is accumulated on the attention point/action history DB and the recommendation/advertisement DB, and a recommendation is generated based on the user's attribute and action history and transmitted to the moving image collection/delivery the server 101a in order to select an information group to increase the user's convenience and interest such as an advertisement and present the information group to an individual user.

In addition, the metadata information collection processing system 412 performs, analysis of metadata added to a moving image uploaded by the user terminal. For example, in case of text data, a meaningful noun (a proper noun or a general noun) is extracted by a linguistic process including morphological analysis, and in case of voice data, voice data is converted into a text by a voice recognition process, and a meaningful noun is similarly extracted through a linguistic process. The extracted noun (group) is stored in a metadata DB 101d together with a corresponding moving image as metadata.

In FIG. 20(A), the user selects a moving image thumbnail of interest in a channel which is being viewed through the terminal 105, and a corresponding original image is delivered to the terminal from the moving image collection/delivery the server 101a. The selection information is sequentially transmitted to the information collection processing system 412 in real time as the user's attention point information, and accumulated as the attention point information and the user's action history.

Here, the attention point refers to one or more pieces of screen position information representing an object which the user specifies on a screen in order to point a specific object, and as the attention points are transmitted to the server system 101, specific object detection is performed in real time.

In FIG. 20(A), the user is interested in a bag in a moving image and selects the bag. In FIG. 20(A), a selection frame 2011 is displayed around the bag. The bag is also recognized in real time by the above-described specific object recognition process.

In FIG. 20(B), as a result of performing specific object recognition on the bag selected by the user, product information is displayed as an image. The bag has a model number xx-xx of a brand A, and thus this fact is displayed as a tag 2021. Next, in FIG. 20(C), according to the user's further request or automatically, candidates 2031 to 2033 such as a cloth, shoes, and an accessory to go with the bag of the brand A, source information 2034 and 2035 such as outlet information or auction information, and information 2036 related to a selected specific object such as the user's evaluation on a corresponding product are simultaneously displayed. The user can select various specific objects in various moving image thumbnails and refer to the added information group together. In this process the server system 101 can accumulate the specific user's preference or action pattern on a database, provide the specific user with a service or information which is more convenient and highly concentrated, and provide more effective marketing information to a service provider or a product provider.

In addition, examples of other processes performed in the information collection processing system 412 include the following processes.

(A) A recommendation or an advertisement of a relevant image is generated by a similarly calculation or the like based on metadata such as an individual user's attention point, category information, and position information (GPS) added to image information and action history calculated by a temporal statistics process, transmitted to the information collection/delivery server 101a as recommendation information, and delivered to a corresponding terminal from the information collection/delivery server 101a together with an original image.

(B) Further, by performing real-time analysis on specific object information to which many users pay attention and a tendency and change of an interest, marketing data with high freshness can be generated.

FIG. 21 illustrates another embodiment in which the user's attribute and action history extracted from an attention object or the like in a moving image uploaded in real time by an individual user is accumulated in the metadata information collection processing system 412, and an information group to increase the user's convenience and interest such as a recommendation or an advertisement generated based on the user's extracted attribute and action history can be presented to an individual user.

Referring to FIG. 21(A), a user 2101 is wearing a display device 2103 (for example, a head-mount display) that receives an image processed by an input device 2102 (for example, a camera) used to capture a moving image in real time and upload the moving image to the moving image delivery/collection server and the server system 101 and displays the image. The input device 2102 may include a position information detecting device such as a GPS. In this case, detected position information (which is the longitude, the latitude, and the altitude serving as a current position for example and includes dynamic position information) is uploaded to the server system 101 together with a moving image, and a moving image is delivered in real time form the server system 101. In FIG. 21(A), a series of communication is performed in a wireless manner.

At this time, the moving image delivery/collection server 101a in the server system 101 executes the general object recognition process and the specific object recognition process on an image uploaded through the input device 2102 in real time through the real-time image recognition system 102 and the MDB 103 in the server system 101, and records category information of a detected object and information of an object recognized as a specific object in the metadata DB 101d in association with an original moving image.

In addition, in FIG. 21(A), it is possible to provide a system in which information on various objects is obtained in real time such that when the user 2101 selects a specific object group recognized by the server system 101 by a pointing operation, various information related to the selected specific object is received from the server system 101, superimposed on an image which is being transmitted in real time, that is, a real image which is being viewed by the user 2101, and monitored through the display device 2103.

FIG. 21(B) illustrates a form in which information on a specific object group recognized by the server system 101 is superimposed on various objects present within sight in naked eyesight in real time and translucently displayed. The information on the specific object group is dynamically tracked with the movement of the user 2101 and the change in light of sight.

As a result, real-time recognition of an object and information display in a real space can be implemented. In other words, a vision AI of a real-time system can be implemented.

The various embodiments described above can be combined to provide further embodiments. All of the commonly assigned US patent application publications, US patent applications, foreign patents, and foreign patent applications referred to in this specification and/or listed in the Application Data Sheet, including but not limited to PCT Application No. PCT/JP2011/059009, filed Apr. 11, 2011 and Japanese Patent Application No. 2010-090727, filed Apr. 9, 2010, are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

REFERENCE SIGNS LIST

100: moving image collection/delivery server system
101a: moving image collection/delivery server
101a-01: reception control unit
101a-02: image processing unit
101a-03: moving image thumbnail generating unit
101a-04: channel configuring unit
101a-05: moving image transmitting unit
101b: moving image manager
101c: moving image archive
101d: metadata/position data etc. DB
102: real-time image recognition system
103: mother database (MDB)
104: network
105a to 105d: terminal
412: metadata information collection processing system
415: copyright management DB

The invention claimed is:
1. A system comprising:
a plurality of terminals; and
one or more servers for receiving a plurality of moving images uploaded by the plurality of terminals, wherein the one or more servers comprise one or more processors, and at least one nontransitory processor-readable medium communicatively coupled to the one or more processors and which stores at least one of processor-executable instructions or data, wherein in use the one or more processors:

recognize a first object and/or scene in the plurality of moving images;

generate moving image thumbnails based on the recognized first object and/or scene;

classify the plurality of moving images into a plurality of moving images channels based on the recognized first object and/or scene;

determine moving images to be transmitted from the plurality of moving images for each of the plurality of moving image channels;

select, in response to a number of the moving images to be transmitted being greater than a predetermined threshold value, one or more moving images from the moving images to be transmitted such that the number of the moving images to be transmitted becomes smaller than the predetermined threshold value;

replace a portion or all of the selected one or more moving images with a portion or all of the moving images to be transmitted; and transmit to at least one of the plurality of terminals a number of moving image thumbnails which are related to the selected one or more moving images or the replaced one or more moving images.

2. The system according to claim 1, wherein the one or more processors select one or more moving images from the moving images to be transmitted based on an order that moving images are uploaded.

3. The system according to claim 2, wherein the one or more processors replace a portion or all of the selected one or more moving images with a portion or all of the moving images to be transmitted based on shooting times of moving images.

4. The system according to claim 1, wherein the one or more processors replace a portion or all of the selected one or more moving images with a portion or all of the moving images to be transmitted based on shooting times of moving images.

5. The system according to claim 4, wherein the one or more processors transmit the moving image thumbnails in a list display format, and when moving image thumbnails related to the replaced one or more moving images are transmitted, the replacement is performed while maintaining positions of the moving image thumbnails in the list display format.

6. The system according to claim 4, wherein the moving image thumbnails include at least one of one or more moving image thumbnails satisfying a specific condition, and the one or more processors deliver the one or more moving image thumbnails satisfying the specific condition so as to be displayed in a predetermined display area of the list display format.

7. The system according to claim 6, wherein the one or more processors recognize a second object and/or scene that is different from the first object and/or scene in the plurality of moving images, and the one or more processors re-organize, divide, merge or end a moving image channel based on the number of moving images in each of the plurality of moving image channels, and/or on the second object and/or scene.

8. The system according to claim 7, wherein the one or more processors re-organize, divide, merge or end a moving image channel based on position information of a terminal to which transmission is to be performed and/or transmitter information.

9. The system according to claim 8, wherein the one or more processors, in response to the one or more processors receiving a request by a user for tracing back time axis information, transmit one or more moving image thumbnails which is related to a time at which a moving image corresponding to a time in the time axis information is uploaded, a shooting time of a moving image, and/or a time at which an arbitrary time is set as a starting point.

10. The system according to claim 9, wherein the plurality of terminals transmit to the one or more processors information about a terminal including at least a user's attribute and action history extracted from a moving image selected by an individual user, a target object in a moving image, a selection order of a moving image, a moving image uploaded by an individual user, and an attention object in a moving image, and wherein the one or more processors accumulate the information about at least one of the terminals and identify information in which a predetermined user is interested based on the information about the at least one of the terminals.

11. The system according to claim 10, wherein the replacement is realized by swapping-in and swapping-out, and in realizing the swapping-in and swapping-out, a portion or all of each of moving image thumbnails to be replaced is subjected to a change in brightness, a change in color or a blinking, or a predetermined pattern or animation is displayed on each of the moving image thumbnails.

12. The system according to claim 8, wherein the one or more processors, in response to the one or more processors receiving information about a specific transmitter, a specific object, and/or a specific location from at least one of the plurality of terminals, transmit a predetermined moving image to at least one of the plurality of terminals.

13. The system according to claim 1, wherein the one or more processors transmit the moving image thumbnails in a list display format, and when moving image thumbnails related to the replaced one or more moving images are transmitted, the replacement is performed while maintaining positions of the moving image thumbnails in the list display format.

14. The system according to claim 1, wherein the one or more processors recognize a second object and/or scene that is different from the first object and/or scene in the plurality of moving images, and the one or more processors re-organize, divide, merge or end a moving image channel based on the number of moving images in each of the plurality of moving image channels, and/or on the second object and/or scene.

15. The system according to claim 1, wherein the one or more processors, in response to the one or more processors receiving a request by a user for tracing back time axis information, transmit one or more moving image thumbnails which is related to a time at which a moving image corresponding to a time in the time axis information is uploaded, a shooting time of a moving image, and/or a time at which an arbitrary time is set as a starting point.

16. The system according to claim 1, wherein the one or more processors, in response to the one or more processors receiving information about a specific transmitter, a specific object, and/or a specific location from at least one of the plurality of terminals, transmit a predetermined moving image to at least one of the plurality of terminals.

17. The system according to claim 1, wherein the one or more processors, when the one or more processors recognize a specific image or predetermined piece of copyright management information in the plurality of moving images, suspend transmission of the recognized moving image and/or a moving image thumbnail which is related to the moving image, or filter a portion or all of the recognized moving image.

18. The system according to claim 1, wherein the plurality of terminals transmit to the one or more processors information about a terminal including at least a user's attribute and action history extracted from a moving image selected by an individual user, a target object in a moving image, a selection order of a moving image, a moving image uploaded by an individual user, and an attention object in a moving image, and wherein the one or more processors accumulate the information about at least one of the terminals and identify information in which a predetermined user is interested based on the information about the at least one of the terminals.

19. One or more servers for receiving a plurality of moving images uploaded by a plurality of terminals, the one or more servers comprising:

one or more processors; and at least one nontransitory processor-readable medium communicatively coupled to the one or more processors and which stores at least one of processor-executable instructions or data, wherein in use the one or more processors:

recognize a first object and/or scene in the plurality of moving images;

generate moving image thumbnails based on the recognized first object and/or scene;

classify the plurality of moving images into a plurality of moving image channels based on the recognized first object and/or scene;

determine moving images to be transmitted from the plurality of moving images for each of the plurality of moving image channels;

select, in response to a number of the moving images to be transmitted being greater than a predetermined threshold value, one or more moving images from the moving images to be transmitted such that the number of the moving images to be transmitted becomes smaller than the predetermined threshold value;

replace a portion or all of the selected one or more moving images with a portion or all of the moving images to be transmitted; and transmit to at least one of the plurality of terminals moving image thumbnails which are related to the selected one or more moving images or the replaced one or more moving images.

20. A computer program product comprising at least one nontransitory computer-readable medium that stores processor-executable instructions which when executed by one or more processors cause the one or more processors which receive a plurality of moving images uploaded by a plurality of terminals, to process the received images by:

recognizing a first object and/or scene in the plurality of moving images;

generating moving image thumbnails based on the recognized first object and/or scene;

classifying the plurality of moving images into a plurality of moving image channels based on the recognized first object and/or scene;

determining moving images to be transmitted from the plurality of moving images for each of the plurality of moving image channels;

selecting, in response to a number of the moving images to be transmitted being greater than a predetermined threshold value, one or more moving images from the moving images to be transmitted such that the number of the moving images to be transmitted becomes smaller than the predetermined threshold value;

replacing a portion or all of the selected one or more moving images with a portion or all of the moving images to be transmitted; and transmitting to at least one of the plurality of terminals a number of moving image thumbnails which are related to the selected one or more moving images or the replaced one or more moving images.

* * * * *